United States Patent
Quint

(10) Patent No.: US 10,697,791 B2
(45) Date of Patent: Jun. 30, 2020

(54) ON-THE-HORIZON NAVIGATION SYSTEM

(71) Applicant: Ford Global Technologies, LLC, Dearborn, MI (US)

(72) Inventor: Jason Meyer Quint, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 203 days.

(21) Appl. No.: 15/871,653

(22) Filed: Jan. 15, 2018

(65) Prior Publication Data

US 2019/0219417 A1  Jul. 18, 2019

(51) Int. Cl.
*G01C 21/36* (2006.01)
*G01C 21/34* (2006.01)

(52) U.S. Cl.
CPC ..... *G01C 21/3676* (2013.01); *G01C 21/3415* (2013.01); *G01C 21/3476* (2013.01); *G01C 21/367* (2013.01); *G01C 21/3632* (2013.01); *G01C 21/3644* (2013.01); *G01C 21/3655* (2013.01)

(58) Field of Classification Search
CPC .............. G01C 21/3676; G01C 21/367; G01C 21/3655; G01C 21/3644; G01C 21/3632; G01C 21/3476; G01C 21/3415
See application file for complete search history.

(56) References Cited

U.S. PATENT DOCUMENTS

| | | | |
|---|---|---|---|
| 7,720,844 B2 * | 5/2010 | Chu | G01C 21/3679 707/724 |
| 8,386,170 B2 | 2/2013 | James | |
| 8,831,873 B2 * | 9/2014 | Tamayama | G01C 21/343 701/410 |
| 9,167,389 B1 | 10/2015 | Murchison et al. | |
| 2014/0229101 A1 * | 8/2014 | Glaser | G01C 21/34 701/487 |
| 2015/0234547 A1 | 8/2015 | Barnett et al. | |
| 2017/0108348 A1 * | 4/2017 | Hansen | H04W 4/44 |

* cited by examiner

*Primary Examiner* — Russell Frejd
(74) *Attorney, Agent, or Firm* — Michael Spenner; Brooks Kushman PC

(57) ABSTRACT

Systems methods, and vehicles for implementing a navigation system include a processor programmed to cause a display to show a graphical user interface that simultaneously presents a map and a graphic object. The map includes guidance for a set route to be traversed by the navigation system. The graphic object includes a timeline for the set route. The timeline indicates travel times between a current position of the navigation system on the set route and occurrences of an interest category associated with the timeline that are upcoming on the set route.

18 Claims, 15 Drawing Sheets

ON-THE-HORIZON NAVIGATION SYSTEM

TECHNICAL FIELD

Aspects of the disclosure generally relate to navigation systems.

BACKGROUND

Navigation systems, such as those integrated in a vehicle or provided via a mobile device, commonly provide route guidance between a starting point and a destination entered by a user.

SUMMARY

In an exemplary embodiment, a navigation system includes a processor programmed to cause a display to show a graphical user interface (GUI). The GUI is configured to simultaneously illustrate a map including guidance for a set route to be traversed by the navigation system and a graphic object. The graphic object includes a timeline for the route that indicates travel times between a current position of the navigation system on the route and occurrences of an interest category associated with the timeline on the route.

In another exemplary embodiment, a navigation system includes a processor configured to cache data identifying an occurrence for each of a plurality of interest categories upcoming on a set route. Responsive to receiving a timeline display request after the data is cached, the processor is further configured to display a timeline rendered from the cached data and indicating a travel time between a current position of the navigation system on the route and the occurrence for one of the interest categories.

In a further exemplary embodiment, A method includes simultaneously displaying, by a navigation system, a map including guidance for a set route to be traversed by the navigation system and a timeline for the route. The timeline indicates travel times between a current position of the navigation system on the route and occurrences of an interest category associated with the timeline on the route.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

A need exists for features enabling a user to quickly and easily access additional route information while traveling a route provided by a navigation system, especially when the user is simultaneously performing other tasks such as driving or biking.

Figure 1:
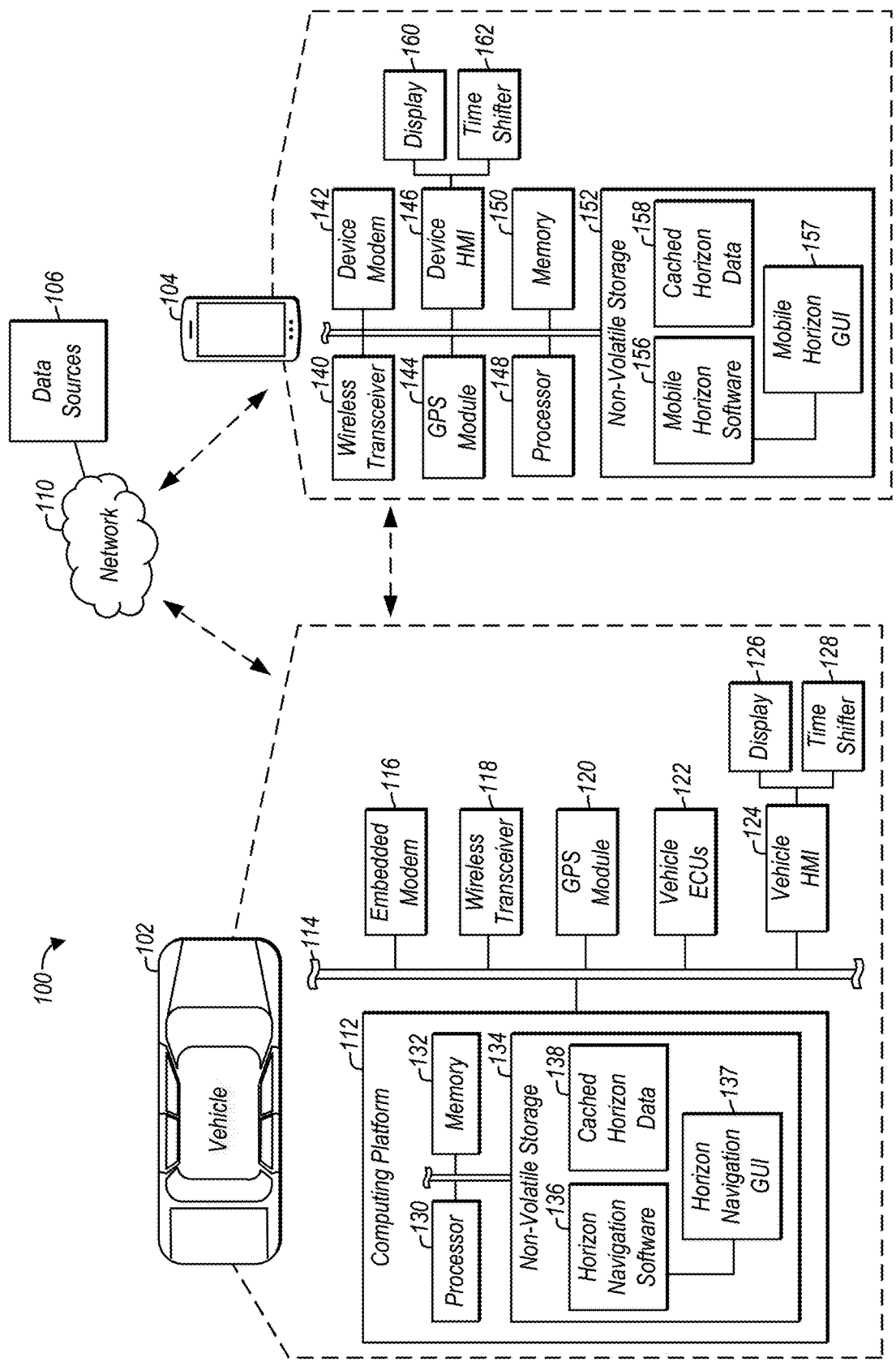
FIG. 1 is a schematic diagram of an exemplary computing environment for providing a navigation system that enables a user to quickly and easily access additional information relating to a set route.

FIG. 1 illustrates a computing environment 100 for providing an improved navigation system that enables a user to simultaneously view route guidance for a destination set by the user, and view occurrences that are associated with categories interesting to the user (e.g., adverse traffic conditions, adverse weather conditions, restaurants, gas stations) and that are coming up on the route. The navigation system may be configured to illustrate the route guidance on a geographical map, and to illustrate the categorical occurrences on one or more timelines showing the travel time between the current position of the navigation system and each occurrence. This configuration allows a user to view the route guidance in terms of geography simultaneously with viewing the interesting occurrences coming up on the route in terms of travel time. Moreover, the occurrences displayed on the one or more timelines may be selectable by the user, and upon their selection, the navigation system may offer the user an option to avoid the occurrence or set the occurrence as a waypoint. These and other features are described in more detail below.

The environment 100 may include one or more of a vehicle 102, a mobile device 104, and one or more data sources 106. One or more of these environment 100 components may communicate with one or more of the other components over the network 110. The network 110 may include one or more interconnected communication networks, such as one or more of the Internet, a cable television distribution network, a satellite link network, a local area network, a wide area network, and a telephone/cellular network.

The vehicle 102 may include various types of automobile, crossover utility vehicle (CUV), sport utility vehicle (SUV), truck, recreational vehicle (RV), boat, plane, E-bike, or other mobile machine for transporting people or goods. In many cases, the vehicle 102 may be powered by an internal combustion engine. As another possibility, the vehicle 102 may be a hybrid electric vehicle (HEV) powered by both an internal combustion engine and one or more electric motors, such as a series hybrid electric vehicle (SHEV), a parallel hybrid electrical vehicle (PHEV), or a parallel/series hybrid electric vehicle (PSHEV). The vehicle 102 may also be an autonomous vehicle (AV). As the type and configuration of vehicle 102 may vary, the capabilities of the vehicle 102 may correspondingly vary. For example, different vehicles 102 may have different capabilities with respect to passenger capacity, towing ability and capacity, and storage volume. For title, inventory, and other purposes, the vehicle 102 may be associated with and include thereon a unique identifier, such as a Vehicle Identification Number ("VIN").

The vehicle 102 may include a computing platform 112 configured to perform functions in support of the processes described herein. For example, the computing platform 112 may implement the navigation system described herein. The computing platform 112 may communicate with other vehicle 102 components via one or more in-vehicle networks 114. The in-vehicle networks 114 may include one or more of a vehicle controller area network ("CAN"), an Ethernet network, and a media oriented system transfer ("MOST") network. The other vehicle 102 components with which the computing platform 112 may communicate may include one or more of an embedded modem 116, a wireless transceiver 118, a global positioning satellite ("GPS") module 120, various vehicle electronic control units ("ECUs") 122, and a vehicle human machine interface ("HMI") 124.

The embedded modem 116 may include one or more cellular modems that facilitate communication between the vehicle 102 and other environment 100 components, such as the data sources 106, over the network 110. In particular, the cellular modems may connect to the Internet over a cellular network to which the modems are subscribed, and retrieve data from the data sources 106 for support of the processes described herein. The data sources 106 may include Internet-accessible sources of geographic data including maps and route guidance, and of data relating to the categories of interest to a user while traveling a set route such as traffic data; weather data; gas station location and price data; electrical vehicle ("EV") charging station location data; restroom location data; emergency care location data; parking lot location data; hospital location data; shopping location data; hotel location, availability, review and price data; park location data; grocery location data; pharmacy location data; and restaurant location, menu, review and hours data.

The wireless transceiver 118 may include one or more wireless transceivers that facilitate direct wireless communication between the vehicle 102 and other environment 100 components, such as when such components are local to (e.g., within wireless communication range of) the wireless transceivers. For example, a wireless transceiver 118 may be configured to directly connect and communicate with a corresponding wireless transceiver 140 of the mobile device 104, and thereby exchange data with the mobile device 104. This data exchange may enable the vehicle 102 to provide features such as hands-free telephone calling, music streaming, and in-vehicle apps. The vehicle 102 wireless transceiver 118 and the mobile device 104 wireless transceiver 140 may communicate via radio frequency ("RF") transmissions. As some non-limiting examples, the vehicle 102 wireless transceiver 118 and the mobile device 104 wireless transceiver 140 may include one or more of a Bluetooth transceiver, a Wi-Fi transceiver, a radio-frequency identification ("RFID") transceiver, a near-field communication ("NFC") transceiver, a keyless entry transceiver, and a smart key transceiver.

In some embodiments, in addition or alternatively to accessing the Internet via the embedded modem 116, the vehicle 102 components may access the Internet via the wireless transceiver 118 and the Internet connection of a wireless gateway, such as the mobile device 104. Specifically, the mobile device 104 may include a connection to the Internet, such as via a device modem 142 similar to the vehicle 102 embedded modem 116 that enables the mobile device 104 to access the Internet over a cellular network to which the device modem 142 is subscribed. When the vehicle 102 wireless transceiver 118 and the mobile device 104 wireless transceiver 140 form a connection, such as via Bluetooth technology, the vehicle 102 wireless transceiver 118 may communicate over the Internet via the mobile device 104 wireless transceiver 140 and the device modem 142. As a further example, the wireless gateway may be hard wired to the Internet, and may include a Wi-Fi transceiver for forming a connection with the Wi-Fi transceiver of the vehicle 102 through which the vehicle 102 components may access the Internet.

The GPS module 120 may identify vehicle 102 geographical data, such as via communicating with the data sources 106, which may include one or more satellites, over the network 110, which may include a satellite link network. The vehicle 102 geographical data may include a current latitude and longitude of the vehicle 102, and may include a current address of the vehicle 102. The GPS module 120 may provide the geographical data to another vehicle 102 component, such as the computing platform 112, automatically or on request. For example, when the computing platform 112 operates to implement the features described herein, the computing platform 112 may cause the vehicle 102 to display a current location of the vehicle 102 and route guidance, which may be derived from the geographical data received at the GPS module 120. In addition to via the Internet, at least some of the other information displayed by the vehicle 102, such as the upcoming categorical occurrences that may be interesting to the user, may also be retrieved via communication between the GPS module 120 and one or more satellites.

The vehicle ECUs 122 may be configured to monitor and manage various functions of the vehicle 102 under the power of the vehicle 102 battery and/or drivetrain. The vehicle ECUs 122 may include, but are not limited to, a powertrain controller configured to monitor and manage engine operating components, a body controller configured to monitor and manage various power control functions such as exterior lighting, interior lighting, keyless entry, remote start, and point of access status verification, a radio transceiver controller configured to communicate with key fobs, mobile devices, or other local vehicle 102 devices, an entertainment controller configured to support voice command and Bluetooth interfaces with the driver and driver carry-on devices, and a climate management controller configured to monitor and manage heating and cooling system components (e.g., compressor clutch, blower fan, temperature sensors, etc.).

The vehicle HMI 124 may facilitate occupant interaction with the vehicle 102, or more particularly, with the other vehicle 102 components. The vehicle HMI 124 may receive input from and output information to a user. The vehicle HMI 124 may include video and alphanumeric displays, a speaker, and any other suitable audio and visual indicators capable of providing data to the user. In the illustrated embodiment, the vehicle HMI 124 includes a display 126 for showing a GUI with the navigational features described herein. The display 126 may be a touch screen display capable of accepting input from a user, and may be included in a center console area of the vehicle 102 or in a gauge cluster area of the vehicle 102. The vehicle HMI 124 may further include an alphanumeric keyboard, a pointing device, keypads, pushbuttons, control knobs, and microphones capable of accepting commands or input from the user to invoke functions of the vehicle 102 components. For example, the vehicle HMI 124 may include steering wheel audio buttons, a push-to-talk button, instrument panel controls, and the like. In the illustrated embodiment, and as explained in further detail below, the vehicle HMI 124 includes a time shifter 128 that enables a user to shift the timelines shown by the navigation system described herein.

The computing platform 112 may include a processor 130, memory 132, and non-volatile storage 134. The processor 130 may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on computer-executable instructions residing in memory 132. The memory 132 may include a single memory device or a plurality of memory devices including, but not limited, random access memory ("RAM"), volatile memory, non-volatile memory, static random access memory ("SRAM"), dynamic random access memory ("DRAM"), flash memory, cache memory, or any other device capable of storing information. The non-volatile storage 134 may include one or more persistent data storage devices such as a hard drive, optical drive, tape drive, non-volatile solid state device, or any other device capable of persistently storing information.

During operation of the vehicle 102, the processor 130 may be configured to read into memory 132 and execute computer-executable instructions embodied as software programs, such as the horizon navigation software 136, residing in non-volatile storage 134. The horizon navigation software 136 may be configured, upon execution by the processor 130, to cause the computing platform 112, or more particularly the processor 130, to implement the functions and features of the navigation system described herein. For example, the horizon navigation software 136 may include a horizon navigation GUI 137, and upon execution, the horizon navigation software 136 may be configured to cause the processor 130 to implement and display the horizon navigation GUI 137. The horizon navigation software 136 may include an operating system ("O/S") and/or one or more applications, each of which may be configured to implement different aspects of the navigation system. For example, the 0/S may be configured to manage computer resources so that one or more applications can be executed by the processor 130. The O/S and/or one of the applications may be configured to receive a destination from a user, compute a route to the destination, and cause display of a map including the route and route guidance. Another application may be configured to manage and cause to be displayed an on-the-horizon graphic object relating to the route, which is described in additional detail below. The computer-executable instructions of the horizon navigation software 136 may be compiled or interpreted from computer programs created using a variety of programming languages and/or technologies, including, without limitation, and either alone or in combination, Java, C, C++, C #, Objective C, Fortran, Pascal, Java Script, Python, Perl, and PL/SQL.

The non-volatile storage 134 may also store data utilized by the horizon navigation software 136 when executed by the processor 130. For example, upon execution, the horizon navigation software may be configured to collect and cache horizon data (i.e., the cached horizon data 138) in the non-volatile storage 134 (or the memory 132). The cached horizon data 138 may include information relating to occurrences upcoming on a set route that are interesting to the user, such as a restaurant occurrence or an adverse weather condition occurrence. In this way, when the horizon navigation software 136 causes the vehicle 102 to display timelines including such occurrences, such as on the display 126 of the vehicle HMI 124, the timeline may be presented to the user without the delay of collecting the cached horizon data 138 from the data sources 106 over the network 110.

The mobile device 104 may also be configured to implement the navigation features described herein. For example, the mobile device 104 may be a cellular smart phone or a portable navigation device, and may include a GPS module 144, device HMI 146, processor 148, memory 150, and non-volatile storage 152, each of which may be substantially similar to those of the vehicle 102. Accordingly, the mobile device 104 non-volatile storage 152 may store mobile horizon software 156 that, upon being read into memory 150 and being executed by the processor 148, causes the processor 148 to make a display 160 of the mobile device 104 show a mobile horizon GUI 157. The mobile horizon GUI 157 may include features substantially similar to those of the horizon navigation GUI 137.

While an exemplary environment 100 is shown in FIG. 1, the example is not intended to be limiting. Indeed, the environment 100 may have more or fewer components, and alternative components and/or implementations may be used. For instance, in addition or alternatively to communicating via the in-vehicle networks 114, two or more vehicle 102 components may be directly connected. As an example, a vehicle ECU 122 may be directly connected to one or more of the embedded modem 116 and the wireless transceiver 118 to support the functions of the vehicle ECU 122 (e.g., each of the body controller, radio transceiver controller, and/or the entertainment controller may be directly connected to the wireless transceiver 118 that supports the controller's functions). As an additional example, one or more of the vehicle 102 components, such as the computing platform 112, may be directly connected to the vehicle HMI 124 to enable user interaction with the vehicle 102 components.

FIGS. 2-14 provide exemplary screens that may be provided by the horizon navigation GUI 137 or by the mobile horizon GUI 157. While the description below primarily focuses on the vehicle 102, it will be understood that the mobile device 104 may implement the same functionality and features unless otherwise noted.

Figure 2:
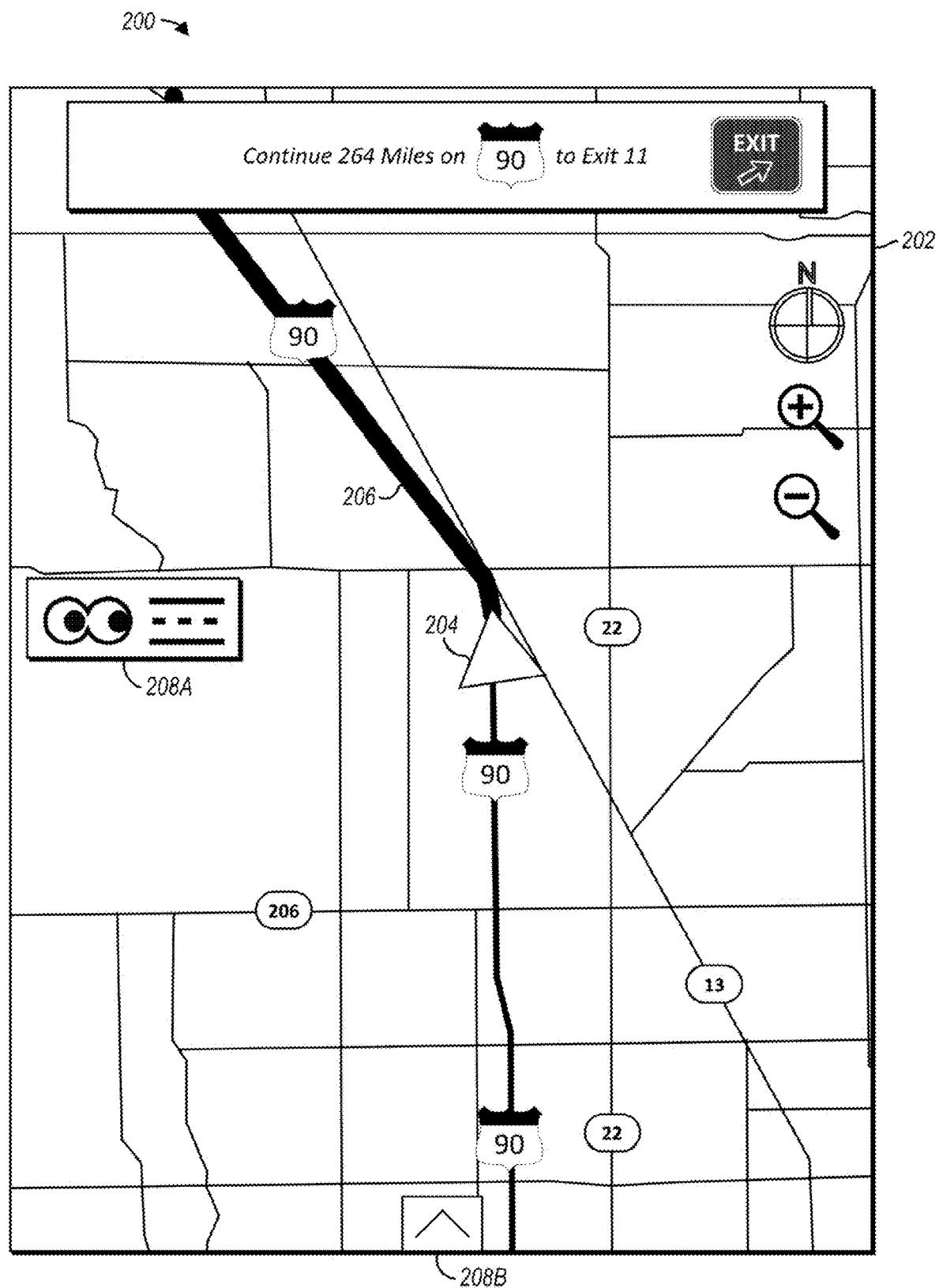
FIG. 2 is a first screenshot of an exemplary graphical user interface ("GUI") that may be provided by the exemplary environment of FIG. 1.

FIG. 2 illustrates a screen 200 that may include a map 202 illustrating a current geographical location of the vehicle 102. Specifically, the map 202 may include a current position indicator 204 indicating the current geographical location and moving direction of the vehicle 102, and may include route guidance 206 instructing how to follow a set route to a set destination. A user may enter a destination into the horizon navigation software 136, such as via the horizon navigation GUI 137. Responsive to receiving the destination, the horizon navigation software 136 may be configured to compute a route between the current position of the vehicle 102 and the destination, such as based on data from the GPS module 120. Once the user sets (i.e., accepts) the route via the horizon navigation GUI 137 and begins traversing the computed route, the horizon navigation GUI 137 may display the map 202 including the current position indicator 204 and route guidance 206. As the vehicle 102 moves along the set route according to the route guidance 206, the horizon navigation GUI 137 may be configured to update the current position indicator 204 and the route guidance 206 shown on the map 202 in real time according to the current geographical position of the vehicle 102. The route guidance 206 and current position indicator 204 may thus be considered as active in the sense that they may constantly change according to the position of the vehicle 102.

Figure 3:
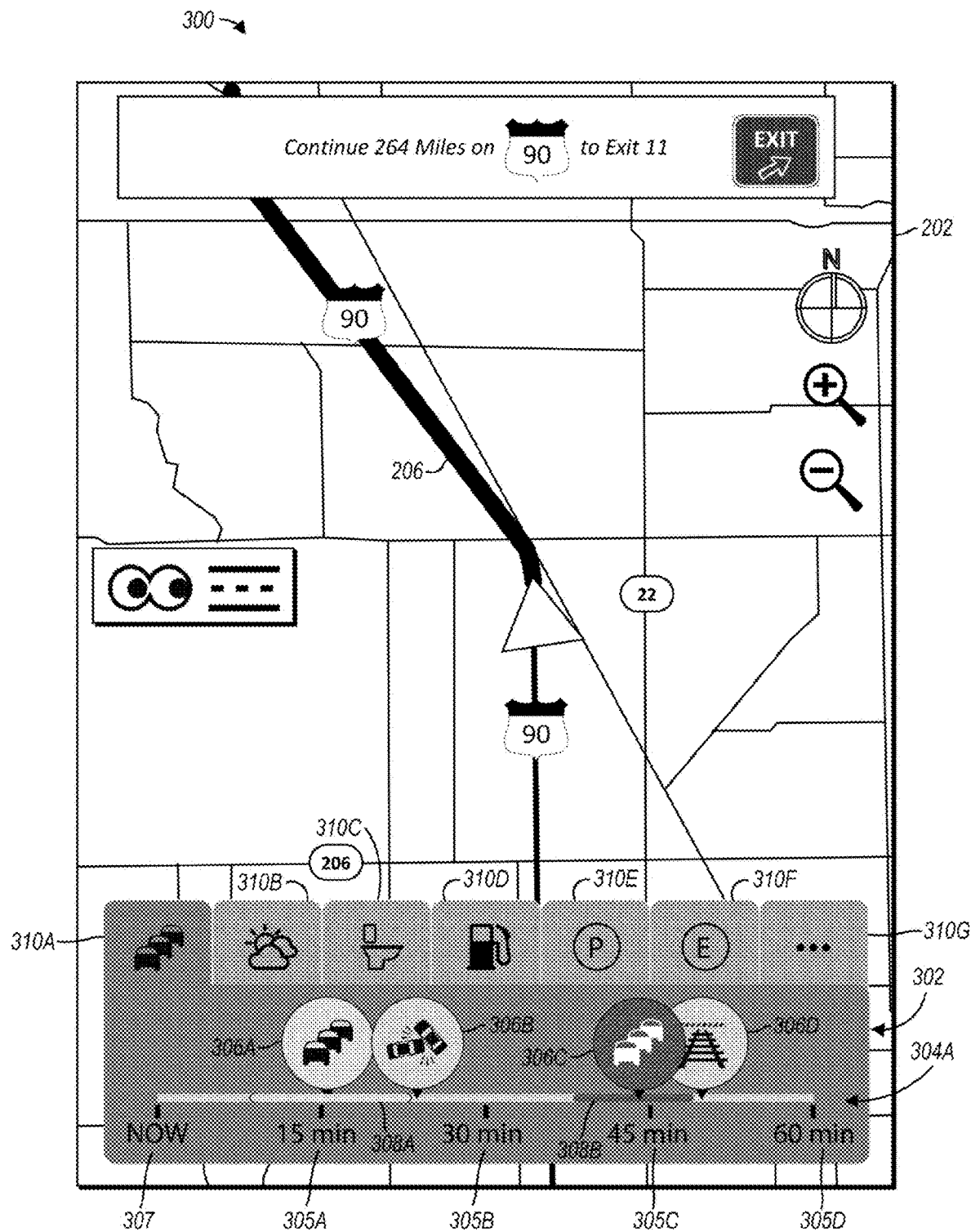
FIG. 3 is a second screenshot of the exemplary GUI that may be provided by the exemplary environment of FIG. 1.

Simultaneously with showing the map 202 and the route guidance 206, the horizon navigation GUI 137 may show one or more user-interactive on-the-horizon activation objects 208. As shown in the illustrated embodiment, for example, the horizon navigation GUI 137 may show a selectable button 208A and a slider indicator 208B. Upon a user interaction with one of the on-the-horizon activation objects 208, such as by selecting the button 208A or swiping up from the bottom of the screen 200 as indicated by the slider indicator 208B, the horizon navigation GUI 137 may be configured to show an on-the-horizon graphic object 302 (FIG. 3). The on-the-horizon graphic object 302 may be configured to display one or more timelines 304, each indicating travel times between a current position of the vehicle 102 on the set route and upcoming occurrences on the route that relate to categories of interest to the user. An upcoming occurrence on a set route may include occurrences that are physically on the route or occurrences within a predetermined distance of the route. In other words, if an occurrence is near a highway exit on a set route, or involves a short detour from the set route, the occurrence may still be considered on the route.

FIG. 3 illustrates a screen 300 that may be provided by the horizon navigation GUI 137 responsive to a user interacting with one of the on-the-horizon activation objects 208 to cause the on-the-horizon graphic object 302 to be displayed. The on-the-horizon graphic object 302 may be configured to display one or more timelines 304, each of the timelines being associated with a different category of interest. For example, the interest category associated with each timeline 304 may be one of fuel (e.g., gas stations, EV charging stations), adverse weather conditions, adverse traffic conditions, parking lots, restrooms, or emergency care. The horizon navigation GUI 137 may be configured to display only one timeline 304 at a time, so as to not overwhelm the user with information.

Each timeline 304 may indicate travel times between the current position of the vehicle 102 and occurrences, such as traffic accidents or restaurants, that are related to the interest category associated with the timeline 304 and are upcoming on the set route. Each timeline 304 may represent travel times from the current position of the vehicle 102 via time indicators 305 chronologically arranged along the timeline 304 and extending from a "now" indicator 307 representing the current position of the vehicle 102 on a set route at a given time. For example, time indicator 305A represents fifteen minutes of travel time on the set route from a current position of the vehicle 102 on the set route, and time indicator 105B may represent thirty minutes of travel time on the set route from a current position of the vehicle 102 on the set route.

In some embodiments, each timeline 304 displayed by the on-the-horizon graphic object 302 may be limited to a same predetermined travel time along the set route from a given position on the set route, again so as to not overwhelm the user by showing occurrences upcoming on the set route that are still quite far away in terms of travel time. For example, in the illustrated embodiment, each timeline 304 is limited to show occurrences within an hour of travel time from a starting point of the timeline 304, such as the current position of the vehicle 102. As the vehicle 102 moves along the set route, the horizon navigation GUI 137 may be configured to automatically update the timelines 304, or at least the currently displayed timeline 304, in real time so as to indicate new occurrences that may now be reached within the predetermined travel time such as an hour.

As shown in the illustrated embodiment, the horizon navigation GUI 137 may be configured show the on-the-horizon graphic object 302 simultaneously with the route guidance 206, thereby enabling a user to view upcoming occurrences of a category interesting to the user without hiding the route guidance 206. The on-the-horizon graphic object 302 may also be configured to enable a user to view and absorb upcoming occurrences of multiple categories without affecting the user's view of the route guidance 206 shown on the map 202. For instance, the on-the-horizon graphic object 302 may include a plurality of tabs 310, with each tab 310 being associated with a different one of the timelines 304 and a different one of the viewable categories. Each tab 310 may further indicate the interest category associated with the timeline 304 of the tab 310, such as via a graphic. In the illustrated embodiment, for example, tab 310A indicates traffic, tab 310B indicates weather, tab 310C indicated restrooms, tab 310D indicates gas, tab 310E indicates parking, tab 310F indicates emergency, and tab 310G indicates additional categories.

Responsive to a user selection of each tab 310, the on-the-horizon graphic object 302 may be configured to display the timeline 304 associated with the tab 310, and to hide the other timelines 304, thereby presenting the user with a concise screen of information. Specifically, a user may submit a timeline change command to the horizon navigation software 136, such as via a selection of a tab 310 of the horizon navigation GUI 137 by a user using the vehicle HMI 124. Responsive to the receiving the timeline change command, the horizon navigation software 136 may be configured to cause the horizon navigation GUI 137 to hide a currently displayed timeline 304 and show the timeline 304 associated with the selected tab 310.

Each occurrence on a timeline 304 may be represented by an occurrence icon describing the occurrence, such as an occurrence icon 306. Moreover, each timeline 304 may include one or more occurrence areas, such as an occurrence area 308, contrasted from a base color of the timeline 304 to indicate a start and end of an occurrence. For example, a larger contrasted occurrence area 308 may indicate a longer occurrence duration, whereas a shorter contrasted occurrence area 308 may indicate a shorter occurrence location. Furthermore, the contrasted occurrence areas 308 and occurrence icons 306 may be color coded according to the severity of the occurrence. For example, a red occurrence area 308 and/or occurrence icon 306 may indicate a severe version of the occurrence, such as a severe adverse traffic condition, while a yellow occurrence area 308 and/or occurrence icon 306 may indicate a relatively lesser severe occurrence.

For example, the timeline 304A shown in the screen 300 is associated with adverse traffic conditions. Accordingly, the timeline 304A shows travel times between the current position of the vehicle 102 on a set route and upcoming occurrences associated adverse traffic conditions on the set route for the next hour. Each adverse traffic condition coming up on the route is represented by an occurrence icon 306 that indicates and describes the adverse traffic condition. Occurrence icon 306A represents a traffic backup, and is associated with a contrasting occurrence area 308A illustrating that the traffic backup will begin at about ten minutes travel time on the set route and will end at about twenty-five minutes travel time on the set route relative to the current position of the vehicle 102. The timeline 304A further includes an occurrence icon 306B representing an accident occurring in about twenty-five minutes on the set route, which may be the cause of the traffic backup represented by occurrence icon 306A. The timeline 304A also includes an occurrence icon 306C indicating a traffic backup that is expected to begin in approximately forty minutes of travel time and is expected to end in approximately fifty minutes of travel time, as indicated by the occurrence area 305C associated with the occurrence icon 306C. The timeline 304A further includes an occurrence icon 306D representing that a track crossing is upcoming on the set route in about fifty minutes of travel time, which may be the cause of the traffic backup represented by the occurrence icon 306C (e.g., train utilization of the track is causing the traffic backup represented by the occurrence icon 306C).

Figure 4:
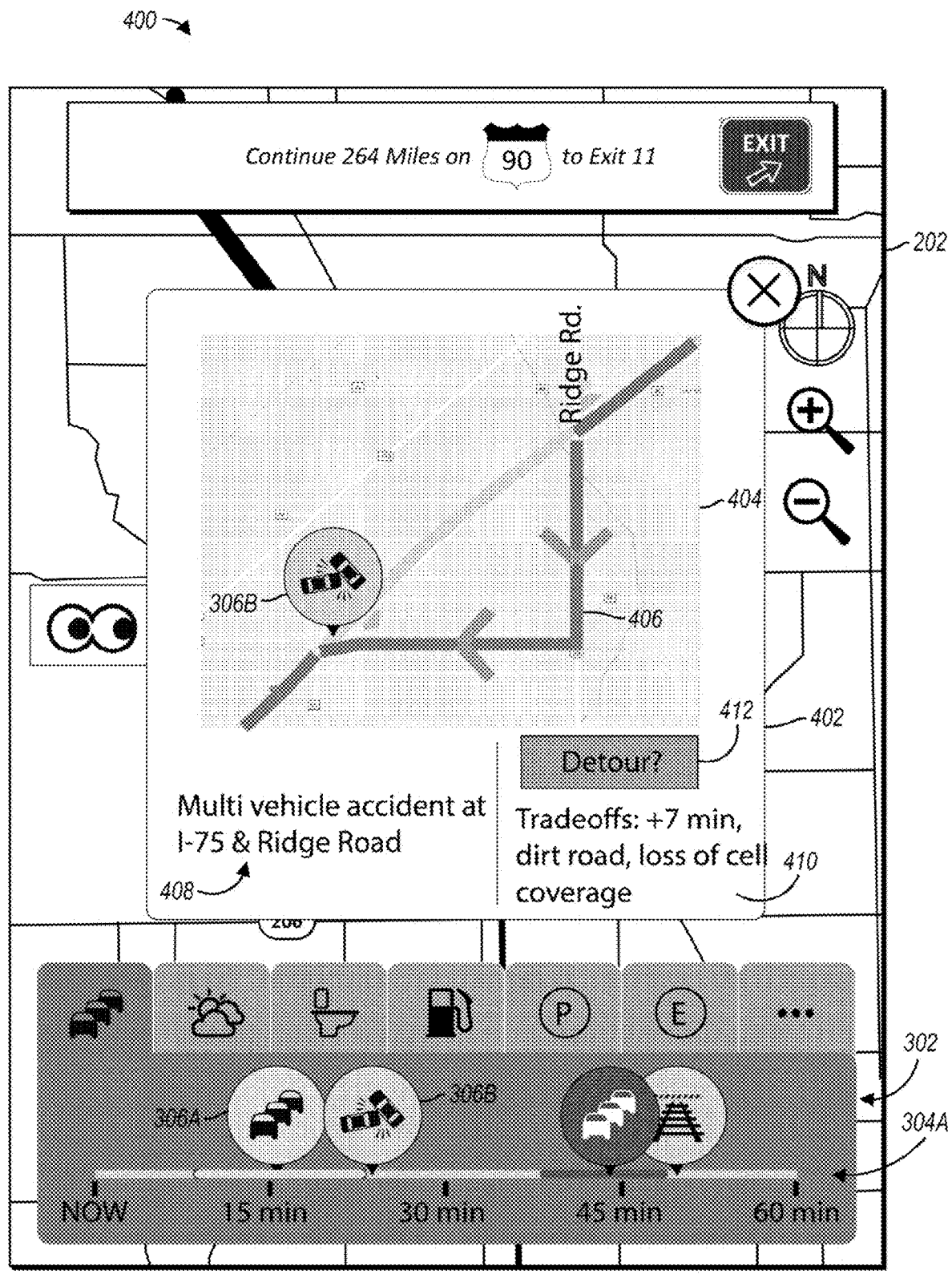
FIG. 4 is a third screenshot of the exemplary GUI that may be provided by the exemplary environment of FIG. 1.

The occurrence icons representing the occurrences may be user-selectable. Responsive to an occurrence icon, such as one of the occurrence icons 306, being selected, the horizon navigation GUI 137 may be configured to generate a window including additional information and one or more options related to the occurrence represented by the selected occurrence icon. For example, FIG. 4 illustrates a screen 400 that may be provided by the horizon navigation GUI 137 responsive to a user selecting the occurrence icon 306A of the timeline 304A associated with adverse road conditions. The screen 400 includes an additional information window 402 generated by the horizon navigation GUI 137 responsive to the user selection of the occurrence icon 306A. As shown in the illustrated embodiment, the horizon navigation GUI 137 may display the additional information window 402 over the map 202, and/or adjacent to but not overlapping the on-the-horizon graphic object 302. In this way, the user may use the information and options offered by the additional information window 402 while also having the option to select another tab 310 to view a different timeline 304.

As shown in the illustrated embodiment, the additional information window 402 may include a map section 404 indicating the cause and geographical location of the cause of the traffic backup represented by the selected occurrence icon 306A, which in this case is an accident represented by the occurrence icon 306B. The map section 404 may further illustrate a detour 406 available to the user to avoid the traffic backup and/or accident. The additional information window 402 may also include a cause section 408 that is separate from the map section 404 and that indicates, in additional detail, the cause of the traffic backup represented by the selected occurrence icon 306A. The additional information window 402 may further include a trade-off section 410 indicating the cons of accepting the detour 406, and may include a user-interactive accept object 412 for accepting the detour 406. Responsive to a user interaction with the accept object 412, the horizon navigation software 136 may be configured to compute a new route to the destination that includes the detour 406, and may be configured to present new route guidance 206 to the user via the horizon navigation GUI 137 in accordance with the new route.

By default, each timeline 304 displayed by the on-the horizon graphical object 302 may start at the current position of the vehicle 102. However, because each timeline 304 may be limited to a predetermined travel time from a given point on the set route, if a timeline 304 starts at the current position of the vehicle 102, the timeline 304 by default may only indicate occurrences happening within the predetermined travel time along the set route from the current position of the vehicle 102. Accordingly, the vehicle 102 may include a mechanism, such as the time shifter 128, by which a user may shift a starting point for the timeline 304 to a different position on the set route other than the current position of the vehicle 102. For example, the time shifter 128 may be a turnable knob. Responsive to turning the knob in a clockwise direction, the horizon navigation software 136, or more particularly the horizon navigation GUI 137, may be configured to shift the starting point of a displayed timeline 304 along the set route away from the current position of the vehicle 102. Responsive to turning the knob in a counterclockwise direction, the horizon navigation software 136, or more particularly the horizon navigation GUI 137, may be configured to shift the starting point of a displayed timeline 304 along the set route backwards towards the current position of the vehicle 102. Thus, turning the knob may change the starting point for a displayed timeline 304 on the set route, thereby enabling the user to view upcoming occurrences beyond the predetermined travel time from the current position of the vehicle 102.

Figure 5:
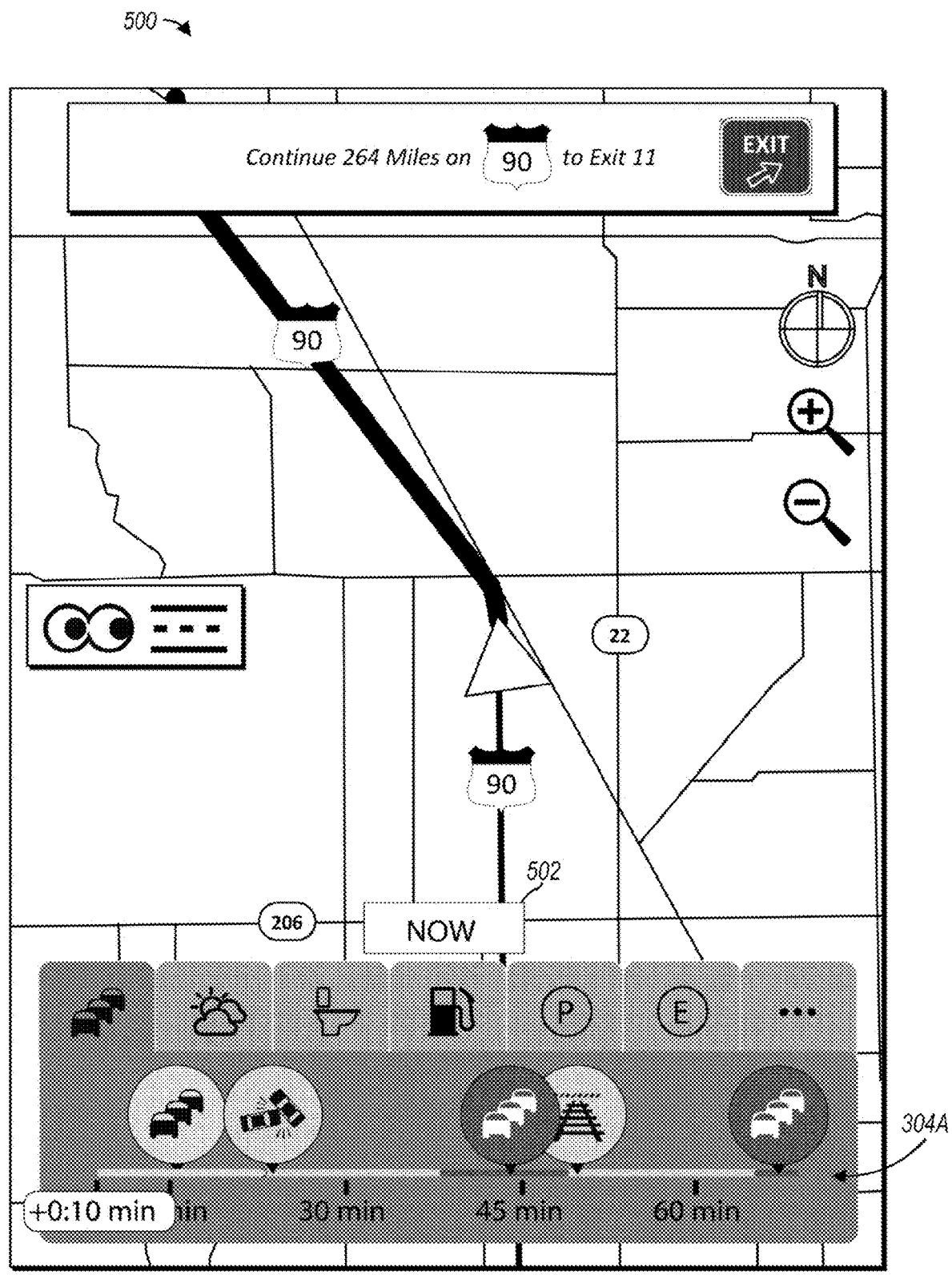
FIG. 5 is a fourth screenshot of the exemplary GUI that may be provided by the exemplary environment of FIG. 1.

As an example, FIG. 5 illustrates a screen 500 that may be provided by the horizon navigation GUI 137 responsive to a user interaction with the time shifter 128 to move a starting point of the timeline 304A associated with adverse traffic conditions. As shown in the illustrated embodiment, the length of the timeline is still limited to a predetermined travel time of an hour, but the timeline has been shifted to begin ten minutes of travel time from the current position of the vehicle 102 instead of at the current position of the vehicle 102, which is why the timeline 304A extends ten minutes past the "60 min" marker of the timeline 304A. The screen 500 also includes a "now" object 502, which upon selection by a user may cause the starting point of the timeline 304A to revert back to the current position of the vehicle 102.

In some embodiments, the horizon navigation software 136 may be configured to store cached horizon data 138 in an electronic storage device, such as in the memory 132 or in the non-volatile storage 134 of the vehicle 102. The cached horizon data 138 may include information for one or more of the timelines 304 able to be displayed by the on-the-horizon graphic object 302 such that, when a user causes one of the timelines 304 to be displayed, the horizon navigation GUI 137 is able to quickly display the timeline 304 based on the cached horizon data 138. In other words, responsive to a user interaction with the horizon navigation GUI 137 that causes the on-the-horizon graphic object 302 to be displayed, or that causes the on-the-horizon graphic object 302 to switch from displaying one timeline 304 to another timeline 304, the horizon navigation software 136 can cause the on-the-horizon graphic object 302 or timeline 304 to be displayed based on the previously cached horizon data 138 without having to retrieve data from the data sources 106 over the network 110. Consequently, system latency between the user interaction and the timeline 304 being displayed is reduced.

For a given timeline 304, the cached horizon data 138 may include information for generating the timeline 304, such as an identification of each occurrence, a geographical location of each occurrence, a travel time from a current position of the vehicle 102 to each occurrence, and additional information about each occurrence, such as severity, length, and any other information relating to the occurrence that may be displayed by the horizon navigation GUI 137. The cached horizon data 138 may also include a rendering of the timeline 304 based on the other cached data. For each timeline 304, the cached horizon data 138 may be limited to including data relating to occurrences within the predetermined travel time represented by the timeline 304 from the current position of the vehicle 102, and may be updated continuously as the vehicle 102 changes position on the set route.

Figure 6:
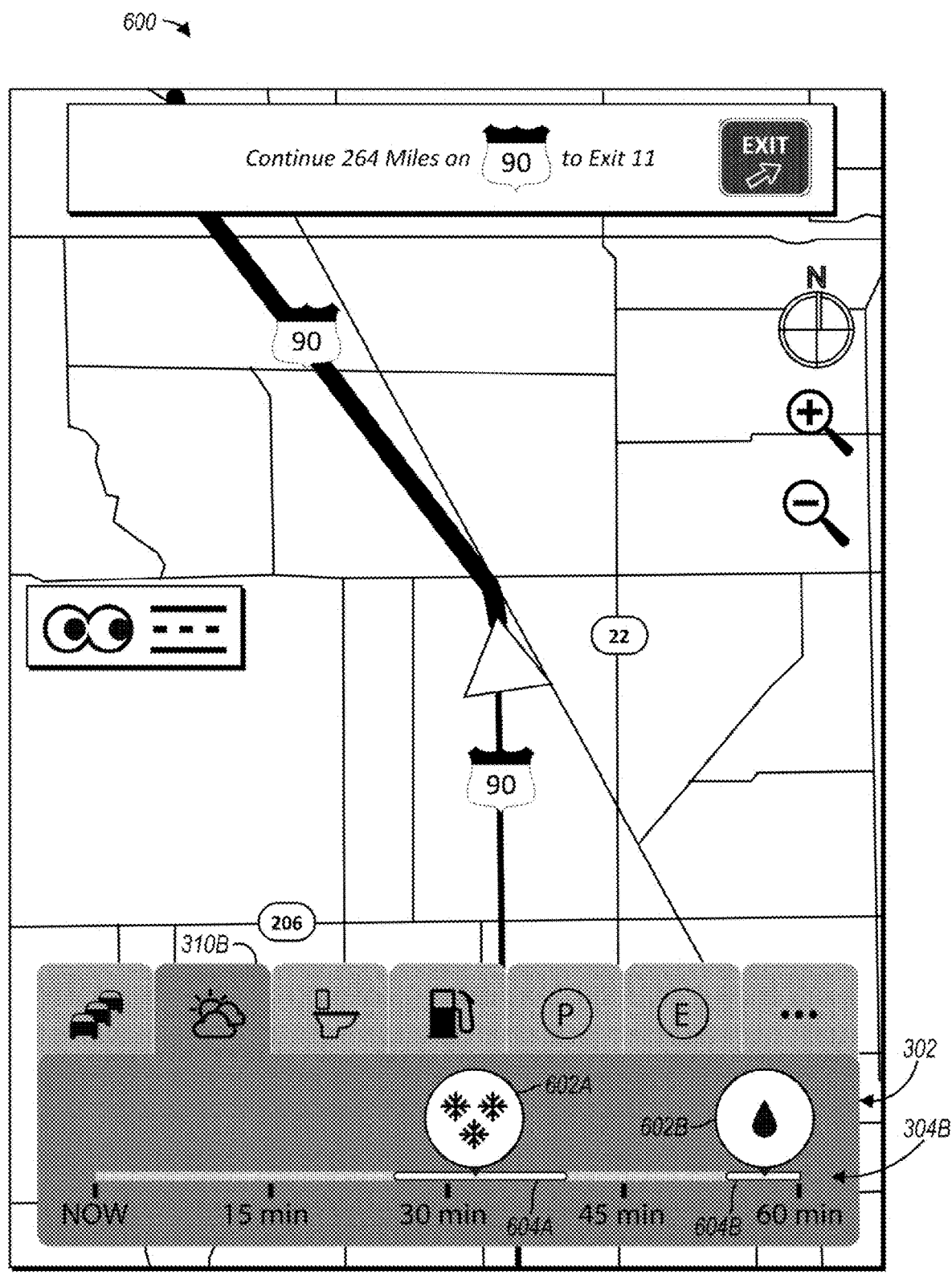
FIG. 6 is a fifth screenshot of the exemplary GUI that may be provided by the exemplary environment of FIG. 1.

FIG. 6 illustrates a screen 600 that may be shown by the horizon navigation GUI 137 responsive to a user selecting the tab 310B of the on-the-horizon graphic object 302. Specifically, responsive to a user selecting the tab 310B, the on-the-horizon graphic object 302 may be configured to show the timeline 304B, which may be associated with the interest category of adverse weather conditions. The displayed timeline 304B may thus indicate a travel time between the current position of the vehicle 102 on the set route and occurrences of adverse weather conditions upcoming on the set route.

The occurrences of adverse weather conditions may be represented by occurrence icons 602, each of which may indicate the type and/or severity of the adverse weather condition. For example, as shown in the illustrated embodiment, the occurrence icon 602A includes snowflakes to indicate an upcoming snow condition, where the number of snowflakes in the occurrence icon 602A indicates the severity of the snow condition on the set route (e.g., more snowflakes signifies increased severity). The icon 602B includes a rain drop to indicate an upcoming rain condition on the set route, where the number of rain drops in the icon 602B indicates the severity of the rain condition (e.g., more rain drops signifies increased severity). The timeline 304B may further include an occurrence area 604 associated with each occurrence of an adverse weather condition that indicates an expected length of the occurrence. Each occurrence area 604 may be overlaid on and contrast with a base color of the timeline 304B, and may thereby graphically illustrate a starting and ending time of the occurrence relative to travel time from the current position of the vehicle 102.

Figure 7:
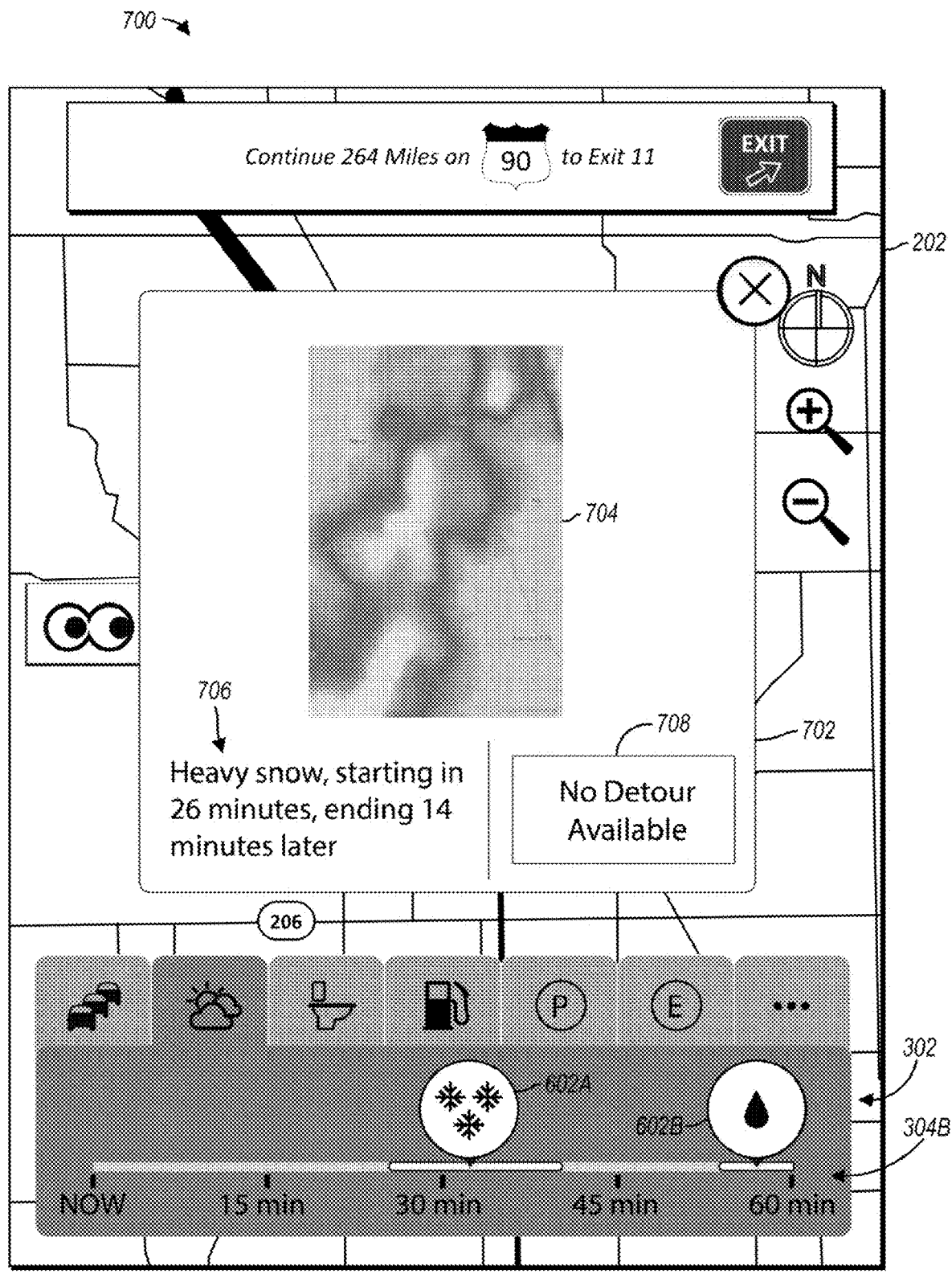
FIG. 7 is a sixth screenshot of the exemplary GUI that may be provided by the exemplary environment of FIG. 1.

FIG. 7 illustrates a screen 700 that may be displayed by the horizon navigation GUI 137 responsive to one of the occurrence icons 602 of the screen 600 being selected. Specifically, responsive to one of the occurrence icons 602 being selected, the horizon navigation GUI 137 may be configured to display an additional information window 702 specific to the occurrence represented by the selected occurrence icon 602. The additional information window 702 may be displayed simultaneously with the map 202 and the on-the-horizon graphic object 302, and may be overlaid on the map 202 adjacent to the on-the-horizon graphic object 302. The additional information window 702 may include a weather map 704 corresponding to the occurrence, a description 706 of the adverse weather occurrence including a start time relative to travel time from the current position of vehicle 102 and an ending time relative to the start time. The additional information window 702 may further include a detour option 708 that, upon its selection, causes the horizon navigation software 136 to compute a new route to the destination that avoids the adverse weather condition. If no detour is available, however, then the detour option 708 may be greyed out and/or indicate that no detour is available, as shown in the illustrated embodiment.

Figure 8:
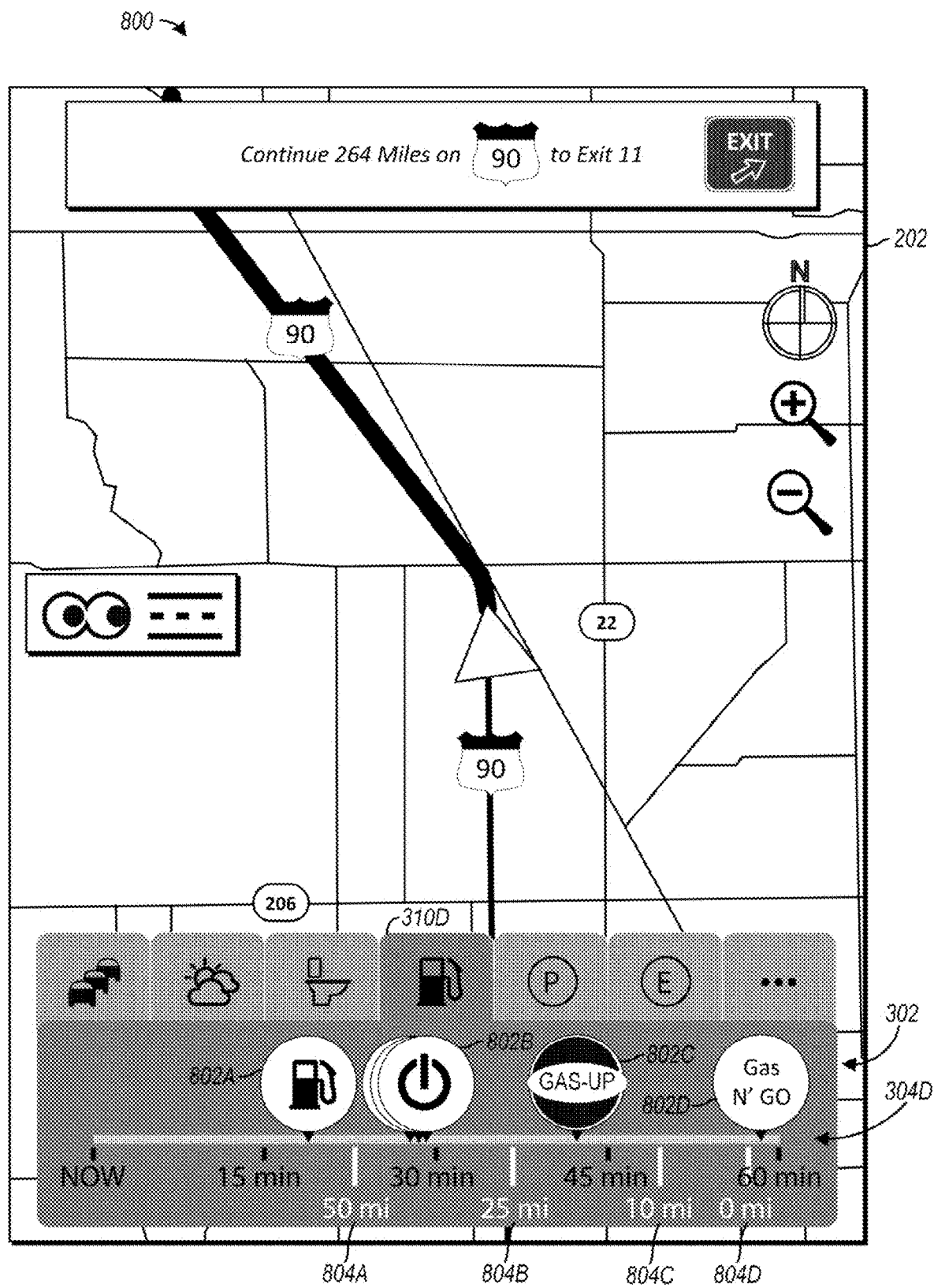
FIG. 8 is a seventh screenshot of the exemplary GUI that may be provided by the exemplary environment of FIG. 1.

FIG. 8 illustrates a screen 800 that may be shown by the horizon navigation GUI 137 responsive to a user selecting the tab 310D of the on-the-horizon graphic object 302. Specifically, responsive a user selecting the tab 310D, the on-the-horizon graphic object 302 may be configured to show the timeline 304D, which may be associated with the interest category of upcoming gas stations and/or upcoming electric vehicle ("EV") charging stations. The displayed timeline 304D may thus indicate a travel time between the current position of the vehicle 102 on the set route and occurrences of gas stations and/or EV charging stations upcoming on the set route. The horizon navigation software 136 may be configured to cause the timeline 304D to show either upcoming gas stations or upcoming EV charging stations based on the vehicle 102 type. For example, if the vehicle 102 is an EV, the timeline 304D may only include upcoming EV charging stations; if the vehicle 102 is a gas automobile, the timeline 304D may only include upcoming gas stations; and if the vehicle 102 is a hybrid, the timeline 304D may include both upcoming gas stations and upcoming EV charging stations.

The occurrences of gas stations and/or EV charging stations may be represented by occurrence icons 802. One or more of the occurrence icons 802 may indicate a brand of the gas station and/or EV charging stations upcoming on the route. If several upcoming gas stations and/or EV charging stations are approximately within a same distance and travel time from the current position of the vehicle 102, then the timeline 304D may include several gas station indicators overlaid on one another, each representing one of the upcoming gas stations and/or EV charging stations, as is illustrated by the occurrence icon 802B. This situation may occur, for example, when a highway exit on the set route includes several nearby gas stations and/or EV charging stations.

Simultaneously with showing occurrences of gas stations and/or EV charging stations, the timeline 304D may also include a plurality of fuel indicators 804, each indicating a distance to empty after a given amount of travel time from the current position of the vehicle 102. For example, in the illustrated embodiment, fuel indicator 804A indicates that between fifteen and thirty minutes of travel along the set route from the current position of the vehicle 102, the vehicle 102 will have fifty miles of fuel (e.g., gas, battery power) remaining, and fuel indicator 804D indicates that after about fifty-five minutes of travel along the set route from the current position of the vehicle 102, the vehicle 102 will be out of fuel. In this way, a user may simultaneously view travel time to gas stations and/or EV charging stations and available travel time on remaining fuel relative to the current position of the vehicle 102, thereby enabling the user to make an informed decision about when to stop for more fuel.

Figure 9:
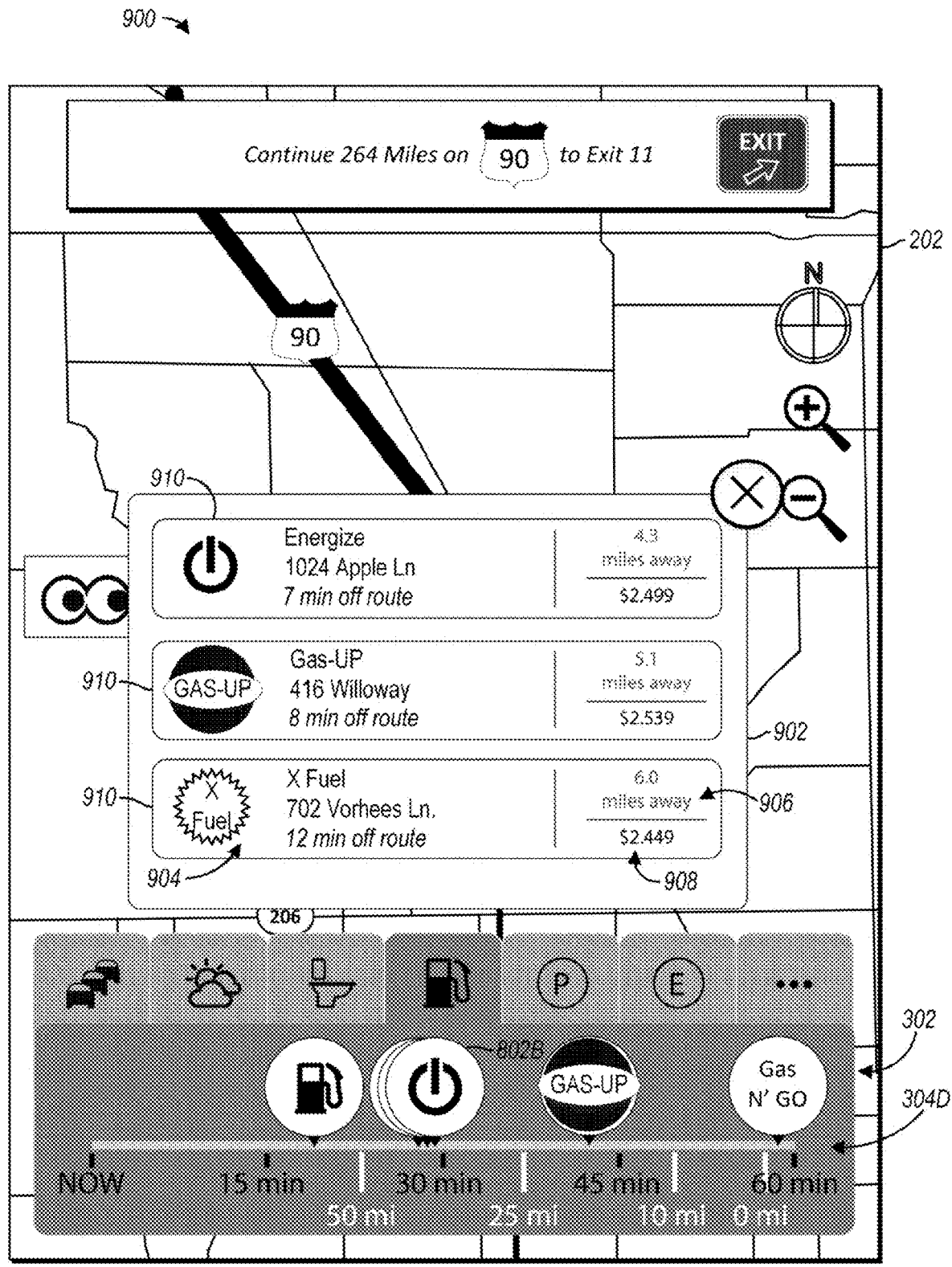
FIG. 9 is an eight screenshot of the exemplary GUI that may be provided by the exemplary environment of FIG. 1.

FIG. 9 illustrates a screen 900 that may be displayed by the horizon navigation GUI 137 responsive to one of the occurrence icons 802 of the screen 800 being selected. Specifically, responsive to one of the occurrence icons 802 being selected, the horizon navigation GUI 137 may be configured to display an additional information window 902 specific to the occurrence or occurrences represented by the selected occurrence icon 802. The additional information window 902 may be displayed simultaneously with the map 202 and the on-the-horizon graphic object 302, and may be overlaid on the map 202 adjacent to the on-the-horizon graphic object 302 to enable a user to select another category interest tab 310.

For a single occurrence, the additional information window 902 may include an identification section 904 indicating the name, address, and detour time relative to the set route of the gas station and/or EV charging station associated with the selected occurrence icon 802. The additional information window 902 may further include a distance section 906 indicating a current distance of the gas station and/or EV charging station represented by the selected occurrence icon 802 from the current position of vehicle 102, and may include a price information section 908 indicating the current price of fuel at the gas station and/or EV charging station represented by the selected occurrence icon 802. As shown in the illustrated embodiment, if the selected occurrence icon 802 represents multiple stations (e.g., occurrence icon 802B), then the resulting additional information window 902 may show the above information for each of the stations in a plurality of records 910. Each station included in the additional information window 902 may be user-selectable. Upon selection of one of the stations shown in the additional information window 902 by a user, the horizon navigation software 136 may be configured to add the station as a waypoint to the set route.

Figure 10:
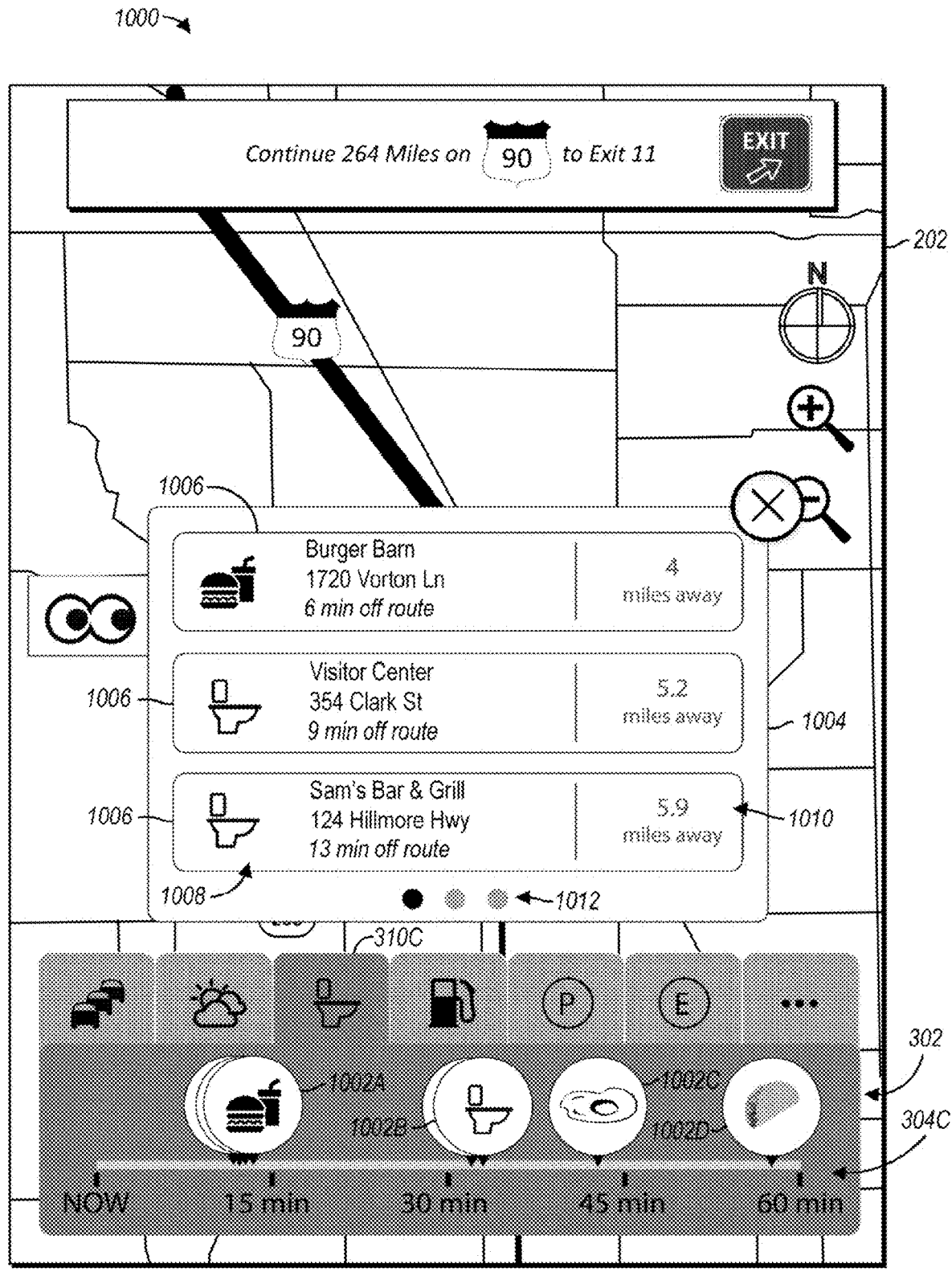
FIG. 10 is a ninth screenshot of the exemplary GUI that may be provided by the exemplary environment of FIG. 1.

FIG. 10 illustrates a screen 1000 that may be shown by the horizon navigation GUI 137 responsive to a user selecting tab 310C of the on-the-horizon graphic object 302. Specifically, responsive to a user selecting the tab 310C, the on-the-horizon graphic object 302 may be configured to show the timeline 304C, which may be associated with the interest category of upcoming restrooms on the set route. The displayed timeline 304C may thus indicate a travel time between the current position of the vehicle 102 on the set route and occurrences of restrooms upcoming on the route.

The occurrences of restrooms may be represented by occurrence icons 1002. One or more of the occurrence icons 1002 may indicate the location of the restroom (e.g., located in a particular brand of restaurant) coming up on the set route. If several restrooms are located near one another, and accordingly are approximately within a same distance and travel time from the current position of the vehicle 102, an occurrence icon 1002 of the timeline 304C may include several restroom indicators overlaid on one another, each representing one of the upcoming restrooms (e.g., occurrence icons 1002A, 1002B). This situation may occur, for example, when a highway exit on the set route includes several nearby restrooms.

Responsive to one of the occurrence icons 1002 being selected, the horizon navigation GUI 137 may be configured to display an additional information window 1004 including additional information about the one or more restrooms represented by the selected occurrence icon 1002. The additional information window 1004 may be displayed simultaneously with the map 202 and the on-the-horizon graphic object 302, and may be overlaid on the map 202 adjacent to the on-the-horizon graphic object 302 to enable a user to select another category interest tab 310. The additional information window 1004 may include a record 1006 for each restroom represented by the selected occurrence icon 1002. Each record 1006 may include an identification section 1008 indicating a location name, address, and detour time relative to the set route for the restroom represented by the record 1006. Each record 1006 may further include a distance section 1010 indicating a current distance of the restroom represented by the record 1006 from the current position of the vehicle 102. Upon selection of one of the displayed records 1006, the horizon navigation software 136 may be configured to add the restroom of the selected record 904 as a waypoint to the set route.

In some embodiments, when an additional information window, such as the additional information window 1004, is displayed responsive to selecting an occurrence icon, such as an occurrence icon 1002, the additional information window may include a mechanism for quickly transitioning to displaying additional occurrences represented by the selected icon (if, for example, the selected icon represents more than the number of occurrences configured to be shown by the additional information window 1004), or those occurrences represented by other occurrence icons. For example, as shown in the illustrated embodiment, the mechanism may be a swipe mechanism indicated by a dot graphic 1012. The dot graphic 1012 may include a dot for each set of occurrences displayable at a given time by the additional information window 1004, with one of the dots being highlighted to show which set is currently being displayed in the additional information window 1004. In the illustrated embodiment, the additional information window 1004 is displaying a set of restrooms represented by the occurrence icon 1002A, and the first dot in the dot graphic 1012 is highlighted. Upon a user swiping right, the additional information window 1004 may be configured to show a further set of additional restroom occurrences represented by the occurrence icon 1002A and/or restroom occurrences represented by occurrence icon 1002B, 1002C, and/or 1002D. Responsive to each swipe, each subsequent dot in the dot graphic 1012 may be highlighted, and the previously highlighted dot may be non-highlighted.

Figure 11:
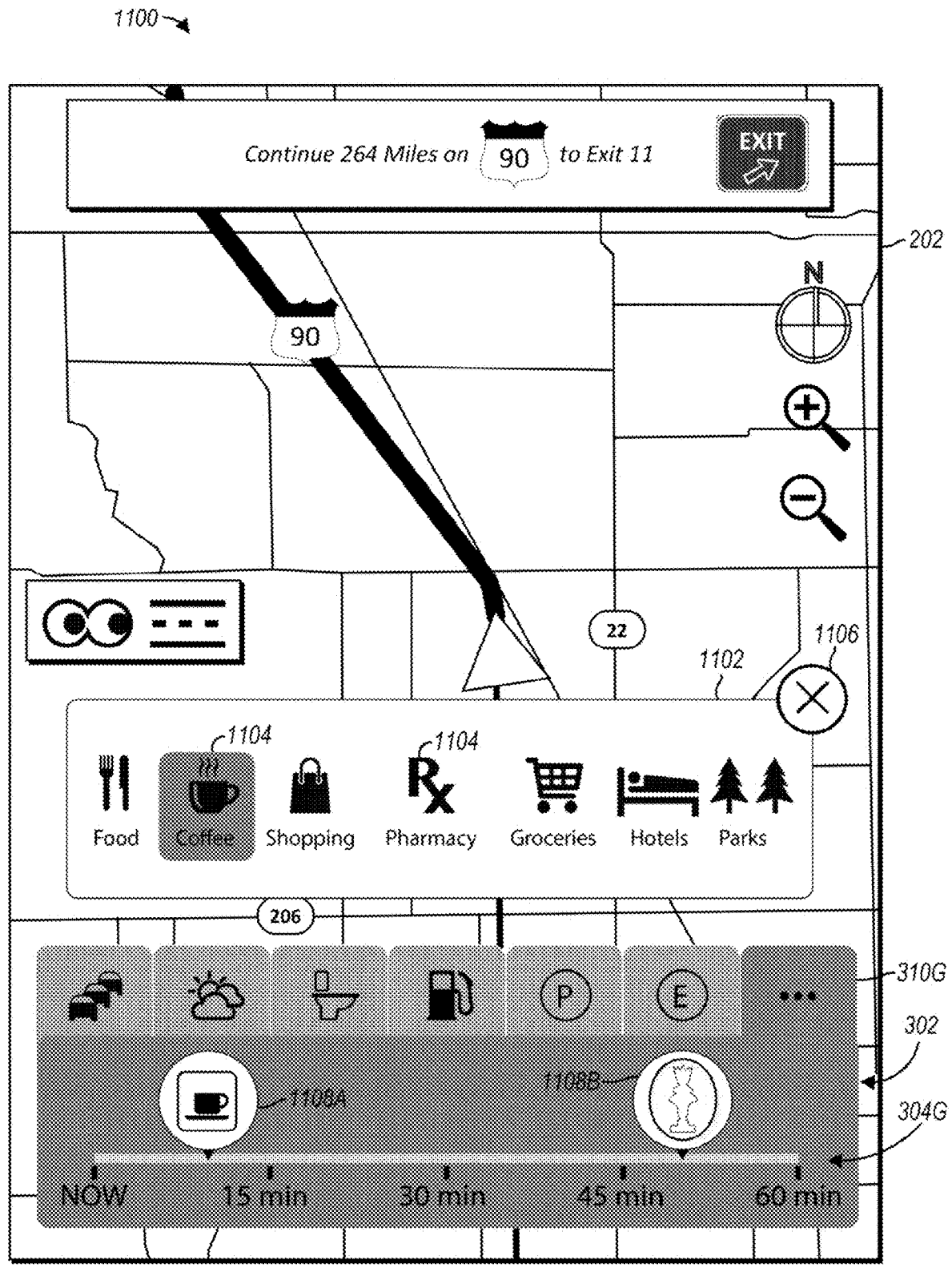
FIG. 11 is a tenth screenshot of the exemplary GUI that may be provided by the exemplary environment of FIG. 1.

FIG. 11 illustrates a screen 1100 that may be shown by the horizon navigation GUI 137 responsive to a user selecting the more tab 310G of the on-the-horizon graphic object 302. Responsive to a user selecting the more tab 310G, the on-the-horizon graphic object 302 may be configured to show a selection bar 1102. The selection bar 1102 may be displayed over the map 202 and adjacent to the on-the-horizon graphic object 302. The selection bar 1102 may show additional category interests 1104 that are not represented by the other tabs 310. The horizon navigation GUI 137 may be configured such that upon user selection of one of the additional category interests 1104, the on-the-horizon graphic object 302 is configured to show an additional category interest timeline 304G associated with the selected additional category interest 1104. The selection bar 1102 may further include an exit icon 1106 (which may be included on any of the additional information windows as well) that, upon selection by a user, causes the horizon navigation GUI 137 to hide the selection bar 1102 and thereby enable the user to simultaneously view the route guidance 206 and the additional category interest timeline 304G. Alternatively, the horizon navigation GUI 137 may be configured to automatically hide the selection bar 1102 responsive to selection of one of the additional category interests 1104.

Furthermore, the horizon navigation GUI 137 may be configured such that a user is able to drag one of the additional category interests 1104 from the selection bar 1102 to the on-the-horizon graphic object 302 to become a tab 310. The horizon navigation GUI 137 may also be configured to enable a user to drag a tab 310 from the-on-the horizon graphic object 302 to remove the tab 310 therefrom, and may be configured to enable the user to re-order the tabs 310 by dragging one tab 310 in front of or behind another tab 310.

Like the other timelines 304, the additional category interest timeline 304G may indicate a travel time between the current position of the vehicle 102 on the set route and occurrences upcoming on the route relating to the selected additional category interest 1104. The occurrences may be represented by occurrence icons 1108, which may indicate the brand of the upcoming occurrence. Furthermore, if several occurrences are located near one another, and accordingly are approximately within a same distance and travel time from the current position of the vehicle 102, an occurrence icon 1108 of the additional category interest timeline 304G may include several occurrence indicators overlaid on one another, each representing one of the upcoming occurrences. This situation may occur, for example, when a highway exit on the set route includes several nearby occurrences. In the illustrated embodiment, coffee is the selected additional category interest 1104. Accordingly, the additional category interest timeline 304G shows travel times between the current location of the vehicle 102 and coffee shops upcoming on the route, each of which is indicated by an occurrence icon 1108 showing the brand of coffee shop.

Figure 12:
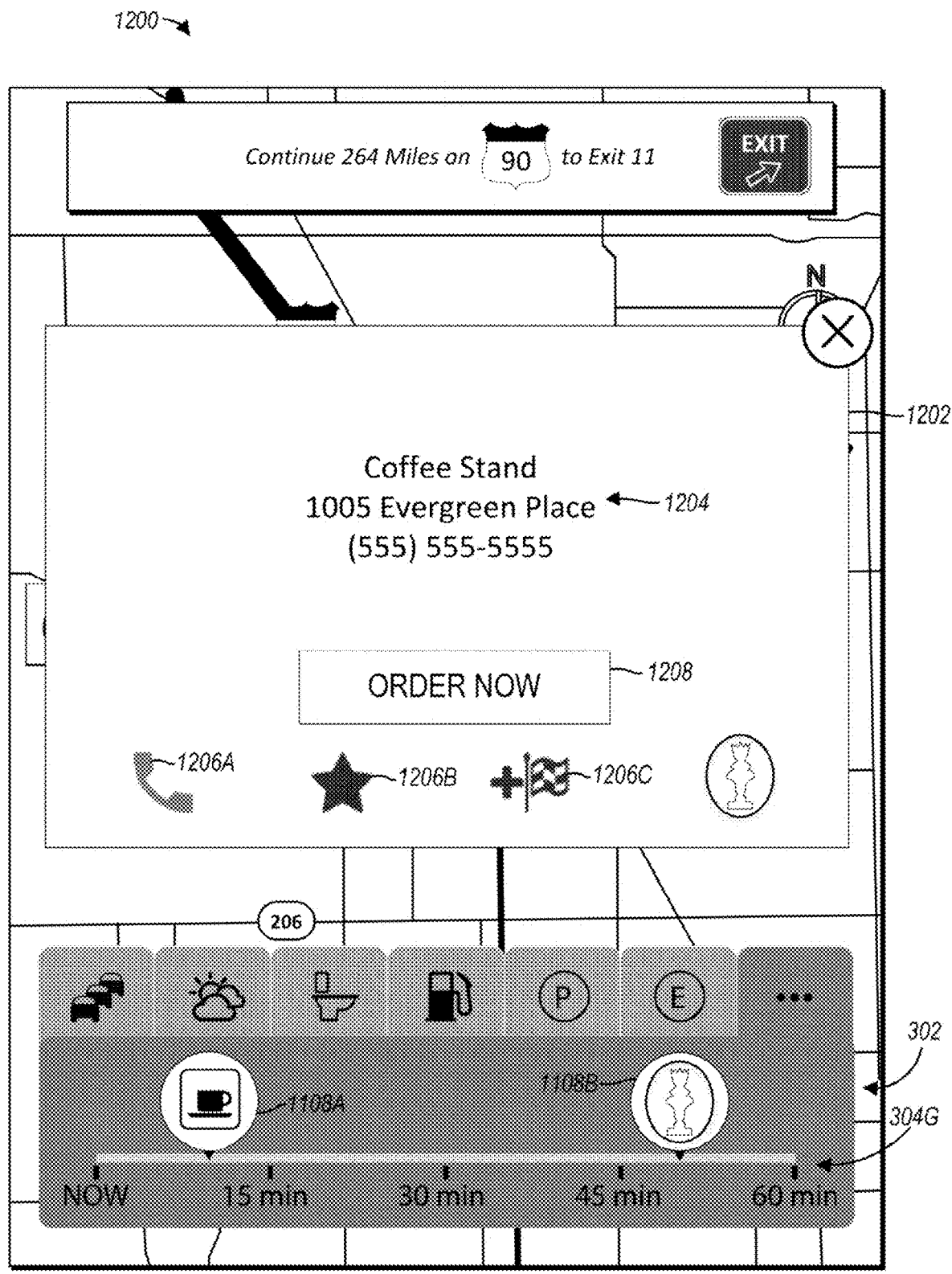
FIG. 12 is an eleventh screenshot of the exemplary GUI that may be provided by the exemplary environment of FIG. 1.

When an occurrence on a timeline 304 relates to a reservable service or orderable good, selection of the occurrence icon associated with the occurrence may cause the horizon navigation GUI 137 to display a window enabling reservation or ordering of the service or good. For example, FIG. 12 illustrates a screen 1200 that may be shown by the horizon navigation GUI 137 responsive to a user selecting the occurrence icon 1108A associated with a coffee shop. Responsive to selection of the occurrence icon 1108A by a user, the horizon navigation GUI 137 may be configured to display an additional information window 1202 including information and interactive elements related to the coffee shop associated with the selected occurrence icon 1108A. In particular, the additional information window 1202 may include an information area 1204 indicating the name, address, and phone number of shop. The additional information window 1202 may further include user-selectable options 1206 such as an option to call the shop via a mobile phone connected to the vehicle 102 (option 1206A), an option to add the shop to a list of favorites (option 1206B), and an option to add the coffee shop as a waypoint to the set route (option 1206C). The additional information window 1202 may further include a user-selectable order element 1208, which upon selection, may cause the horizon navigation GUI 137 to display a menu for transmitting an order to the coffee shop from the vehicle 102.

Figure 13:
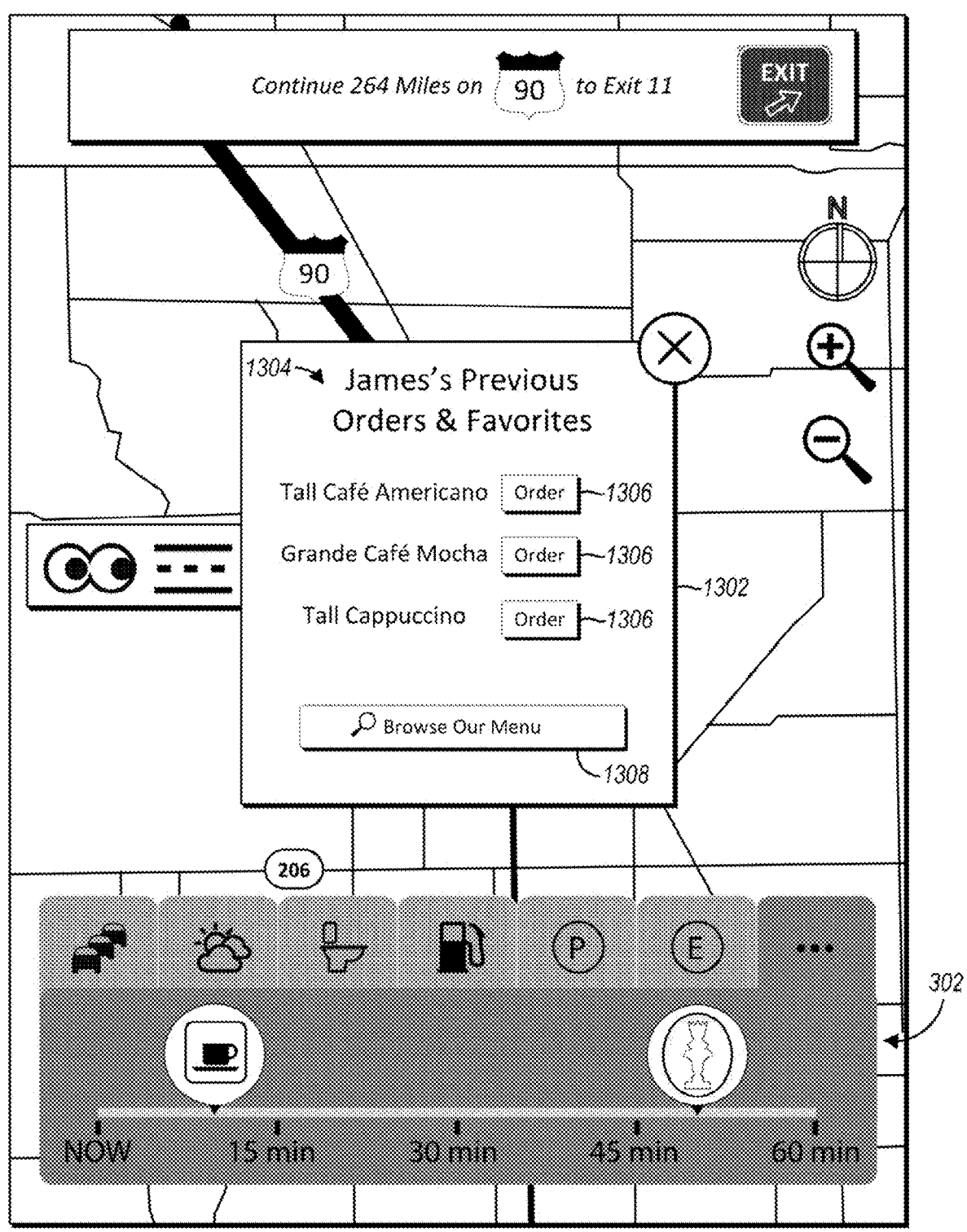
FIG. 13 is a twelfth screenshot of the exemplary GUI that may be provided by the exemplary environment of FIG. 1.

FIG. 13 illustrates a screen 1300 that may be provided by the horizon navigation GUI 137 responsive to a user interaction with the order element 1208. As shown in the illustrated embodiment, responsive to a user interaction with the order element 1208, the horizon navigation GUI 137 may be configured to display an ordering window 1302. The horizon navigation GUI 137 may be configured to display the ordering window 1302 over the map 202 and/or adjacent to the on-the-horizon graphic object 302 to enable continued viewing and interaction thereof by the user. The ordering window 1302 may include an order section 1304 indicating recent orders and saved favorites from the occurrence represented by the selected occurrence icon 1108. Each recent order of saved favorite may be associated with an order element 1306 which, upon selection of the user, causes the vehicle 102 to transmit the order to the occurrence represented by the selected occurrence icon 1108, such as via the embedded modem 116 over the Internet. The ordering window 1302 may also include a browsing option 1308 that, upon interaction with by the user, enables the user to search and order from the menu of the occurrence represented by the selected occurrence icon.

Figure 14:
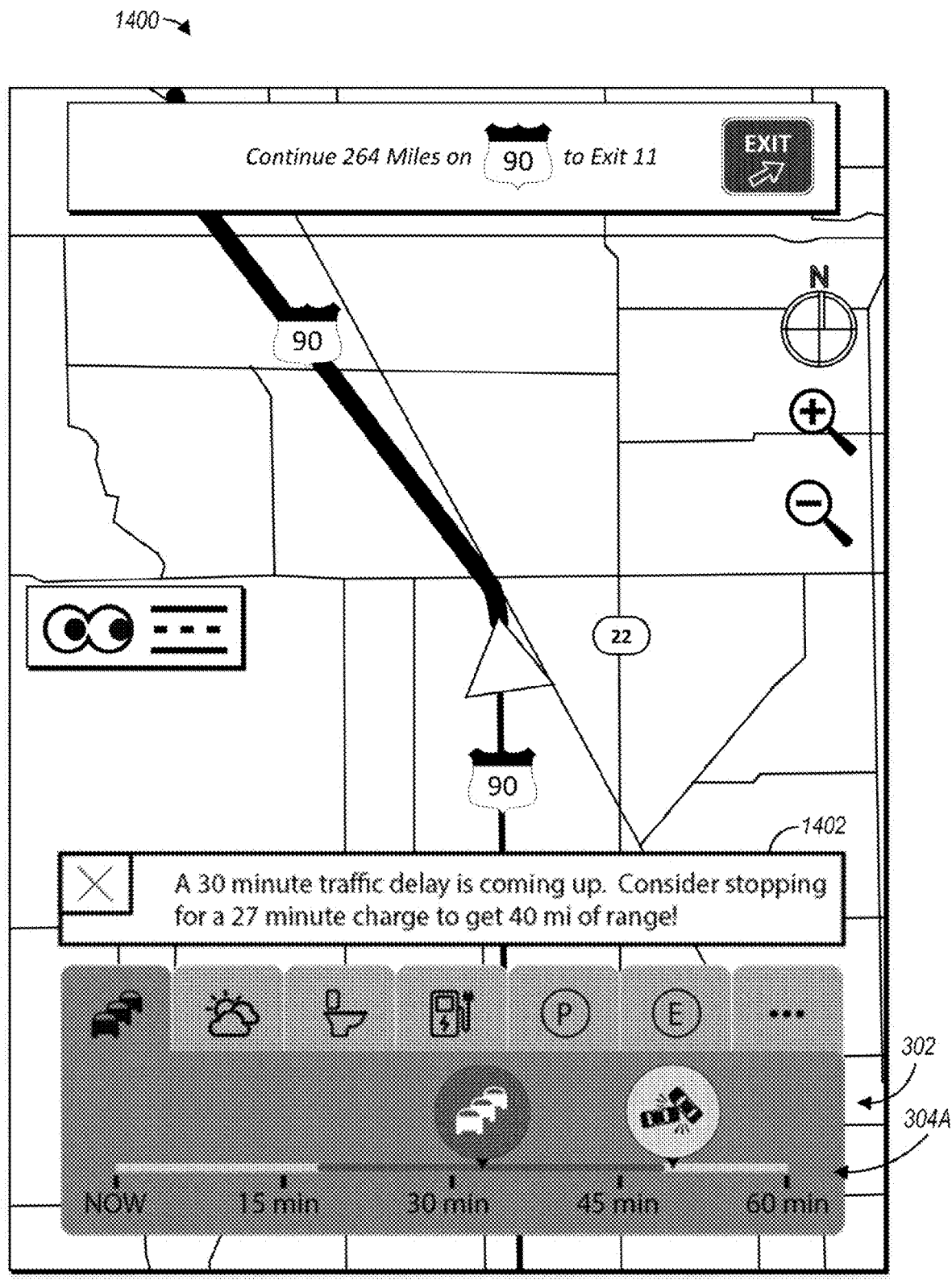
FIG. 14 is a thirteenth screenshot of the exemplary GUI that may be provided by the exemplary environment of FIG. 1.

FIG. 14 illustrates a screen 1400 that may be automatically generated by the horizon navigation software 136 via the horizon navigation GUI 137 responsive to an upcoming occurrence. Responsive to an upcoming occurrence, such as a traffic backup, the horizon navigation software 136 may be configured to identify and display a recommendation 1402 relating to the occurrence. The recommendation may include advice that aids a user in handling an upcoming adverse occurrence, and may be based on several rules pre-programmed into the horizon navigation software 136.

The advice of the recommendation 1402 may relate to two or more of the interest categories, such as by recommending an upcoming occurrence of one interest category to aid in overcoming an adverse occurrence of another category. For example, as shown in the illustrated embodiment, the timeline 304A may indicate that a thirty (30) minute traffic backup is approaching. Accordingly, the horizon navigation software 136 may determine that for the vehicle 102 to have enough energy to traverse the traffic backup without running out of fuel, the vehicle 102 should stop at a nearby EV charging station and be charged for twenty-seven (27) minutes to gain forty (40) miles of range, enough to withstand the traffic backup without running out of fuel. The horizon navigation software 136 may be configured to cause the horizon navigation GUI 137 to display this advice as the recommendation 1402.

Additional recommendations 1402 may include advice to avoid an upcoming adverse weather occurrence or traffic backup occurrence by stopping at an upcoming restaurant occurrence before the adverse occurrence, and may include advice to stop at an upcoming restroom occurrence, restaurant occurrence, or fuel occurrence prior to reaching a stretch of the route or a traffic backup in which no restroom, restaurant, or fuel will be available for a given period of time. A recommendation 1402 may also be based on a current time of day. For example, if near meal time, the recommendation 1402 may include advice to stop at an upcoming restaurant occurrence, such as if a restaurant occurrence will not be available on the route for a given period of time. As a further example, if it is past a given time, the recommendation 1402 may include advice to stop at an upcoming hotel occurrence, such as if a hotel occurrence will not be available on the route for a given period of time.

Figure 15:
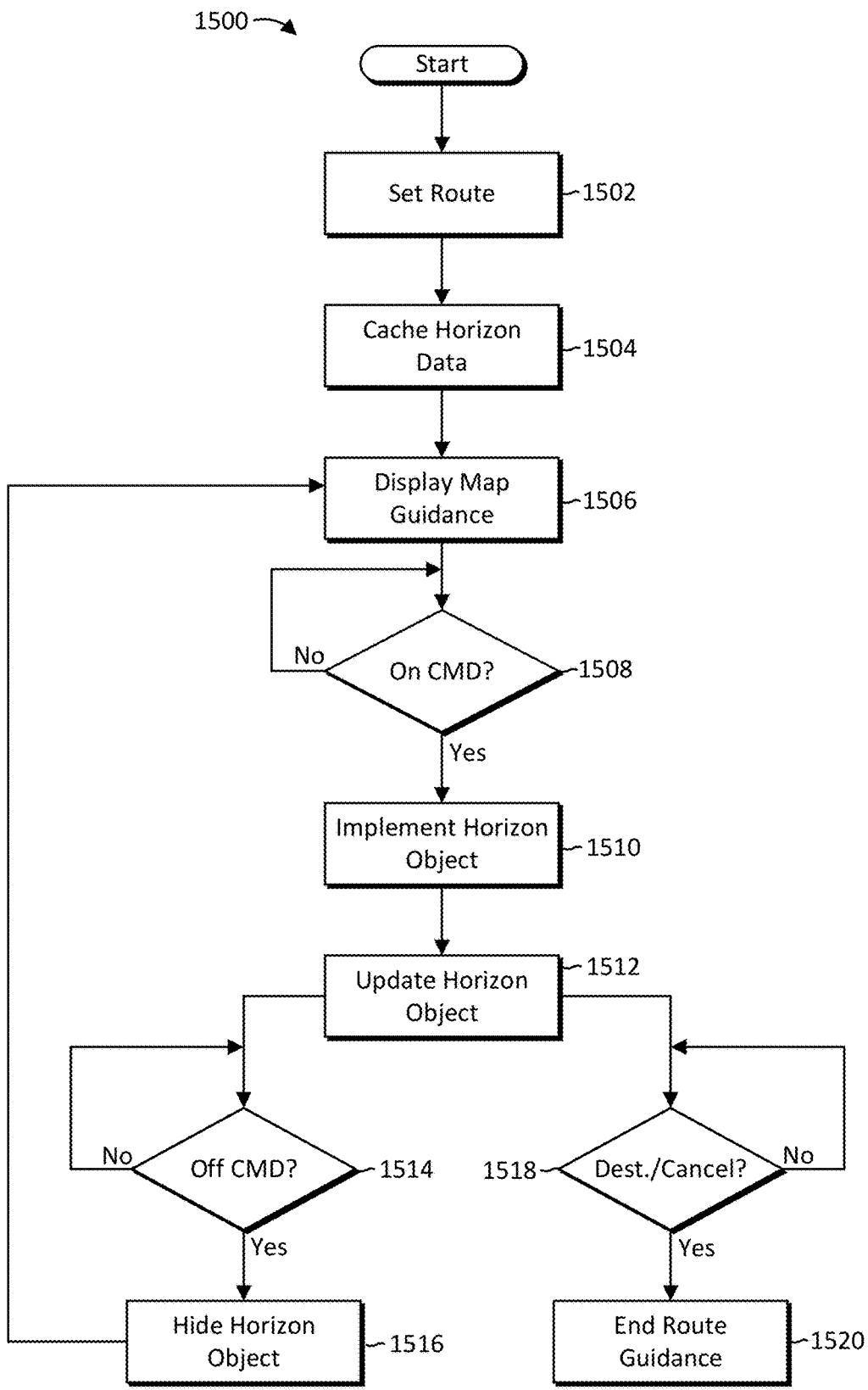
FIG. 15 is a flowchart of a process that may be performed by the exemplary environment of FIG. 1.

FIG. 15 illustrates a process 1500 that may be performed by the exemplary environment 100, or more particularly upon execution of the by the horizon navigation software 136 of the computing platform 112. In block 1502, a route from a current position of the vehicle 102 to an entered destination me be set. In particular, a user may submit a destination into the horizon navigation software 136 via the vehicle HMI 124 and the horizon navigation GUI 137. Thereafter, the horizon navigation software 136 may be configured to compute and cause the horizon navigation GUI 137 to present the user with a route option for traveling to the destination, such as via data from the GPS module 120. Responsive to the user accepting the provided route option, such as via the horizon navigation GUI 137 and the vehicle HMI 124, the horizon navigation software 136 may be configured to set the selected route.

In block 1504, responsive to the route being set, the horizon data may be cached (e.g., cached horizon data 138). In particular, the horizon navigation software 136 may be configured to retrieve the cached horizon data 138 from the data sources 106 over the Internet, and store the cached horizon data 138 in the non-volatile storage 134. The cached horizon data 138 may define the timelines displayable by the horizon navigation software 136 via the horizon navigation GUI 137, and may thus indicate sets of one occurrences upcoming on the set route, where each set of one or more occurrences relates to a different interest category (e.g., traffic, weather, restrooms, fuel, parking, emergency). Upon request by a user to display a timeline, the horizon navigation software 136 may utilize the cached horizon data 138 to cause the horizon navigation GUI 137 to display the timeline while avoiding latency resulting from retrieving the data for the timeline from the data sources 106 and/or from rendering the timeline in response to the request.

In block 1506, map guidance may be displayed for the set route. In particular, the horizon navigation software 136 may be configured to cause the horizon navigation GUI 137 to display the map 202 that includes the current position indicator 204 indicating the current geographical location and moving direction of the vehicle 102. The map 202 may also include the route guidance 206 instructing the user how to traverse the roads of the map 202 to follow the set route to the entered destination.

In block 1508, a determination may be made of whether a horizon object "on" command is received. In particular, a user may interact with the vehicle HMI 124 to submit the horizon object "on" command to the horizon navigation GUI 137, which may in turn notify the horizon navigation software 136 of the command. For example, a user may interact with one of the on-the-horizon activation objects 208 shown on the map 202 to submit the command.

Responsive to receiving the on-the-horizon on command ("Yes" branch of block 1508), in block 1510, the on-the-horizon graphic object 302 and related functions described above may be implemented. For example, the horizon navigation software 136 may be configured to cause the horizon navigational GUI 137 to simultaneously illustrate the on-the-horizon graphic object 302, the map 202, and the route guidance 206, where the on-the-horizon graphic object 302 includes one or more timelines 304, each timeline 304 being associated with a different interest category and indicating travel times between a current position of the vehicle 102 and occurrences upcoming on the route of the interest category associated with the timeline. The horizon navigation software 136 may further be configured to cause the horizon navigation GUI 137 to hide a currently displayed timeline 304 and display a different timeline 304 responsive to receiving a change timeline command, such as via a user selection of a displayed tab 310 via the vehicle HMI 124. In addition, the horizon navigation software 136 may be configured to shift a starting point of a timeline 304 displayed by the horizon navigation GUI 137 further along the set route away from the current position of the vehicle 102, and shift the starting point of the timeline 304 backwards along the set route towards the current position of the vehicle 102, responsive to opposite user interactions with the time shifter 128 (e.g., rotating a turnable knob in each direction). As another example, the horizon navigation software 136 may be configured to cause the horizon navigation GUI 137 to, responsive to selection of an occurrence displayed on a timeline 304, overlay a window on the map 202 that includes additional information and/or options relating to the selected occurrence (e.g., avoid the occurrence, set the occurrence as a waypoint on the set route, order from the occurrence).

In block 1512, the on-the-horizon graphic object 302 and associated data may be updated. In particular, the horizon navigation software 136 may be configured to update a displayed timeline 304 as the vehicle 102 moves along the set route. For example, the horizon navigation software 136 may be configured to adjust travel times to occurrences of a displayed timeline 304, to remove occurrences that the vehicle 102 has passed, and/or to include travel times to new occurrences that are within a predetermined travel time of the vehicle 102 along the set route. Furthermore, the horizon navigation software 136 may be configured to update the cached horizon data 138 by retrieving new data from the data sources 106 over the Internet that identifies new occurrences and their location for each interest category of each timeline 304. In this way, when a user directs the horizon navigation software 136 to display a different timeline 304, the latency of retrieving new data over the Internet and/or rendering a new timeline based on an updated position of the vehicle 102 is avoided.

In block 1514, a determination may be made of whether an on-the-horizon "off" command is received, such as by the horizon navigation software 136. For example, a user may interact with the vehicle HMI 124 to submit the on-the-horizon "off" command to the horizon navigation GUI 137, which may send a corresponding signal to the horizon navigation software 136. More particularly, the user may interact with one of the on-the-horizon activation objects 208 to submit the on-the-horizon "off" command, such as by selecting the button 208A or swiping towards the slider indicator 208B of the map 202 via the touch-screen display 126.

Responsive to receiving the on-the-horizon "off" command ("Yes" branch of block 1516), the horizon navigation software 136 may be configured to hide the on-the-horizon graphic object 302, but continue showing the map 202 with the route guidance 206 and current position indicator 204 (block 1506). A user may then choose to re-active the on-the-horizon graphic object 302 while traveling the set route if desired (block 1508).

In block 1518, a determination may be made, such as by the horizon navigation software 136, if the set destination is reached, or if a cancellation command is received. For example, a user may interact with the vehicle HMI 124 to submit the cancellation command to the horizon navigation GUI 137, which may then provide a corresponding signal to the horizon navigation software 136. As a further example, the horizon navigation software 136 may identify when the vehicle 102 reaches the destination via the geographical data from the GPS module 120.

Responsive to a determination that the destination is reached or a cancellation command is received ("Yes" branch of block 1518), in block 1520, route guidance may end. For example, the horizon navigation software 136 may cause the horizon navigation GUI 137 to no longer show the route guidance 206, and may cause the horizon navigation GUI 137 to display a notification that the destination has been reached if that is the case. The horizon navigation GUI 137 may be configured to continue showing the map 202 that includes the current position indicator 204 indicative of the geographical position and current direction of the vehicle 102.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A navigation system comprising:
   a display configured to illustrate a graphical user interface (GUI); and
   a processor programmed to
   illustrate a map including guidance for a set route to be traversed by the navigation system; and
   illustrate a graphic object including
   a first tab corresponding to fuel being a first predefined interest category,
   a first timeline for the route, the first timeline indicating travel times between a current position of the navigation system on the route and occurrences of a plurality of fueling stations associated with the first timeline on the route,
a plurality of fuel indicators positioned on the timeline, each fuel indicator indicating a distance to empty after a given amount of travel time from the current position, and
a second tab corresponding to a second predefined interest category,
wherein the processor is further programmed to
responsive to detecting a user input indicative of an intent to switch to the second tab, hide the first timeline and display a second timeline having the same scale as the first timeline, the second timeline indicating occurrences of a plurality of points for the second predefined interest category,
wherein the plurality of points for the second predefined interest category is precached before the user switching to the second tab.

2. The navigation system of claim 1, wherein the second interest category is one of weather, traffic, parking, restrooms, and emergency.

3. The navigation system of claim 1, wherein each of the first timeline and the second timeline represent a same predetermined travel time from the current position of the navigation system.

4. The navigation system of claim 3, wherein the same predetermined travel time is an hour.

5. The navigation system of claim 1, further comprising a turnable knob, wherein responsive to a turn of the knob in a first direction, the GUI is configured to shift a starting point of the first timeline further along the set route away from the current position of the navigation system, and responsive to a turn of the knob in a second direction opposite the first direction, the GUI is configured to shift the starting point of the first timeline backwards along the set route towards the current position of the navigation system.

6. The navigation system of claim 1, wherein the GUI is further configured to update the travel times of the first timeline as the navigation system moves along the set route.

7. The navigation system of claim 1, further comprising:
an electronic storage device operatively coupled to the processor,
wherein the processor is further configured to cache data defining the second timeline in the electronic storage device prior to displaying the second timeline, and
wherein, responsive to a user interaction with an activation object after the data is cached, the GUI is configured to display the second timeline based on the cached data.

8. The navigation system of claim 1, wherein the second timeline includes a plurality of selectable icons each representing a different one of the occurrences of the interest category associated with the second timeline, and upon selection of one of the icons, the GUI is configured to overlay a window on the map that includes information relating to the occurrence represented by the selected icon.

9. The navigation system of claim 8, wherein the window includes an option to add the occurrence represented by the selected icon as a waypoint on the set route.

10. The navigation system of claim 8, wherein the window includes an option to generate a new route that avoids the occurrence represented by the selected icon.

11. A navigation system comprising:
a display configured to display a graphical user interface (GUI); and
a processor configured to
cache data identifying an occurrence for each of a plurality of interest categories upcoming on a set route; and
responsive to receiving a timeline display request after the data is cached, display a first timeline rendered from the cached data and indicating a travel time between a current position of the navigation system on the route and the occurrence for a first one of the interest categories, wherein the first timeline is representative of a traffic interest category, the processor is further configured to
responsive to detecting a traffic condition on a current route, display an information window to inform a user about the traffic condition and suggest an alternative route, and
responsive to detecting the alternative route is not completely covered by a cellular service to which the navigation system is subscribed, display a trade-off message to inform the user; and
a turnable knob, wherein responsive to a turn of the knob in a first direction, the GUI is configured to shift a starting point of the first timeline further along the set route away from the current position of the navigation system, and responsive to a turn of the knob in a second direction opposite the first direction, the GUI is configured to shift the starting point of the first timeline backwards along the set route towards the current position of the navigation system.

12. The navigation system of claim 11, wherein the processor is further configured to, responsive to the route being set in the navigating system, cache the data including the occurrence for each of the interest categories.

13. The navigation system of claim 11, wherein the processor is further configured to, responsive to receiving a change timeline command after the data is cached, hide the first timeline and display a second timeline rendered based on the cached data, the second timeline being associated with a second one of the interest categories and indicating a travel time between the current position of the navigation system on the route and the occurrence for the second interest category.

14. The navigation system of claim 11, wherein the cached data is limited to including occurrences upcoming on the route within a predetermined travel time from the current position of the navigation system.

15. The navigation system of claim 14, wherein the processor is further configured to update the cached data based on a change to the current position of the navigation system on the route and the predetermined travel time.

16. A method for a navigation system comprising:
displaying a map including guidance for a set route to be traversed by the navigation system;
displaying a first timeline for the route indicative of a weather category, the first timeline indicating first travel times between a current position of the navigation system on the route and occurrences of an interest category associated with the first timeline on the route,
responsive to detecting a predefined weather condition,
displaying an icon corresponding to the weather condition on the timeline, the icon being positioned on the timeline corresponding to a travel time between a current position of the navigation system on the set route and the occurrence of the weather condition; and
displaying a weather map corresponding to the weather condition and an alternative route calculated to avoid the weather condition;

precaching data for an interest category associated with a second timeline.

17. The method of claim 16, further comprising, responsive to receiving a timeline change command,
hiding the first timeline; and
displaying the second timeline indicating second travel times between the current position of the navigation system on the route and occurrences of the interest category associated with the second timeline on the route.

18. The method of claim 16, further comprising updating the displayed first travel times as the navigation system moves along the set route.

* * * * *